(12) United States Patent
Chanod et al.

(10) Patent No.: US 6,393,389 B1
(45) Date of Patent: May 21, 2002

(54) USING RANKED TRANSLATION CHOICES TO OBTAIN SEQUENCES INDICATING MEANING OF MULTI-TOKEN EXPRESSIONS

(75) Inventors: Jean-Pierre Chanod; Frédérique Segond; Christopher Thompson, all of Grenoble (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/401,682

(22) Filed: Sep. 23, 1999

(51) Int. Cl.[7] .............................................. G06F 17/28
(52) U.S. Cl. .............................................. 704/7; 704/4
(58) Field of Search ................................ 704/2, 3, 4–8, 704/10, 277; 707/536, 530, 532

(56) References Cited

U.S. PATENT DOCUMENTS

| | | | | |
|---|---|---|---|---|
| 5,475,586 A | * | 12/1995 | Sata et al. ...................... | 704/2 |
| 5,528,491 A | * | 6/1996 | Kuno et al. ..................... | 704/2 |
| 5,541,838 A | * | 7/1996 | Kyama et al. ................... | 704/4 |
| 5,642,522 A | | 6/1997 | Zaenen et al. ............... | 395/794 |
| 5,805,832 A | * | 9/1998 | Brown et al. ................... | 704/2 |
| 5,867,811 A | * | 2/1999 | O'Donoghue .................. | 704/1 |
| 5,930,746 A | * | 7/1999 | Ting ............................... | 704/9 |
| 5,991,710 A | * | 11/1999 | Papineni et al. ................ | 704/2 |
| 6,161,083 A | * | 12/2000 | Franz et al. ..................... | 704/4 |
| 6,278,967 B1 | * | 8/2001 | Akers et al. .................... | 704/2 |

FOREIGN PATENT DOCUMENTS

| | | | | |
|---|---|---|---|---|
| WO | WO-A-99/01828 | 7/1998 | ........... | G06F/17/27 |

OTHER PUBLICATIONS

Aït–Mokhtar S., Chanod, J.P., "Incremental finite–state parsing", in Proceedings of Applied Natural Language Processing 1997 (ANLP'97), Washington, DC, Apr. 1997.

(List continued on next page.)

Primary Examiner—Patrick N. Edouard
(74) Attorney, Agent, or Firm—Oliff & Berridge, PLC

(57) ABSTRACT

To provide information about the meaning of a multi-token expression in a first language, where the information is understandable in a second language, subexpressions are obtained, such as tokens, chunks, and sentences. The multi-token expression could, for example, be a sentence or an input text with more than one sentence. Translation choices are obtained in the second language for a set of the subexpressions. A subset of the translation choices of a subexpression are ranked, and the ranked translation choices are used to produce a sequence of translation choices for the multi-token expression as a whole. Information is then presented to a user about the sequence of translation choices, indicating in the second language the meaning of the multi-token expression. Translation choices can be ranked based on syntactic or semantic context, based on translation source, based on confidence levels, based on how each was obtained, in accordance with a user-selected process, and so forth. Information about the sequence can be presented through a paper or display-based user interface. In response to user signals, additional translation choices can be presented or other modifications can be made. A user-requested change in ranking can propagate to similar subexpressions in the multi-word expression or, through rules or weighted confidence levels, to similar subexpressions in subsequent multi-word expressions.

25 Claims, 7 Drawing Sheets

OTHER PUBLICATIONS

Grefenstette, G., "Light Parsing as Finite–State Filtering", Proceedings ECAI'96 Workshop on Extended Finite–state Models of Language, Budapest, Aug. 11–12, 1996.

Grefenstette et al., "What is a Word, What is a Sentence' Problems of Tokenization.", in the proceedings of The $3^{rd}$ International Conference on Computation Lexicography (Complex '94), pp. 79–87. ISBN 963–8461–78–0, Research Institute for Linguistics Hungarian Academy of Science, Budapest, 1994.

Chanod et al., "a Non–deterministic Tokenister for Finite–State Parsing", proceedings of the ECAI '96 (European Conference on Artificial Intelligence), Aug. 11–12, 1996, Budapest.

Bauer et al., "Locolex: The Translation Rolls Off Your Tongue", in the proceedings of the ACH/ALLC '95 conference (The Association for Computer & the Humanities, The Association for Literary 7 Linguistic Computing), Jul. 11–15, 1995, University of California Santa Barbara.

* cited by examiner

USING RANKED TRANSLATION CHOICES TO OBTAIN SEQUENCES INDICATING MEANING OF MULTI-TOKEN EXPRESSIONS

FIELD OF THE INVENTION

The invention relates to techniques that provide information about expressions in one natural language, with the information being understandable in another natural language.

BACKGROUND

Various techniques have been proposed for providing information about expressions in a first natural language, with the information being understandable in a second natural language. For people who understand the second language but not the first, such information can produce an understanding of expressions in the first language. Some such techniques attempt to perform automatic translation, while other techniques provide machine aids for translation. Yet other techniques provide information without attempting translation.

Bauer, D., Segond, F., and Zaenen, A., "LOCOLEX: the translation rolls off your tongue", in ACH-ALLC '95 Conference Abstracts, Santa Barbara, Calif., Jul. 11–15, 1995, pp. 6–9, describe LOCOLEX, an intelligent reading aid that provides bilingual dictionary lookup through the interaction between a complete on-line dictionary and an on-line text. The user can click on a word in a sentence, and LOCOLEX uses the word's context to look for multiword expressions (MWES) that include the word, to choose between parts of speech for the word based on parts of speech of neighboring words, and to exclude irrelevant information from the dictionary in order to focus the user's attention on the best translation for better comprehension. The user can ask for more information about one meaning by clicking on it to get a usage example, one of the types of dictionary information that is not initially displayed. The lookup process after the user selects a word includes tokenization, normalization of each word to a standard form, morphological analysis, part of speech disambiguation, dictionary lookup, identification of MWEs, and elimination of irrelevant parts of the dictionary for display. To improve recognition of MWEs, they are encoded as regular expressions in a two-level rule formalism, and the rules are inserted into the relevant dictionary entries in place of the existing static text that are the normal forms of the MWEs. LOCOLEX could also make better use of the usage labels and indicators in the dictionary to filter out semantically inappropriate meanings of a word in a given context, such as by interactively asking the user to choose topics and then displaying translations associated with the chosen topics.

A prototype LOCOLEX system provides a user interface in which a user could click on a word about which the user desires information. In response, the system operates as described above to obtain and display a part of a dictionary entry relating to the word's part of speech or to an MWE that includes the word. If the user feels the presented information is inappropriate, the user can click on the word again, and the system responds by displaying the complete dictionary entry.

U.S. Pat. No. 5,642,522 describes a context-sensitive technique for finding information about a word in an electronic dictionary. The technique maps the selected word from its inflected form to its citation form, analyzes the selected word in the context of neighboring and surrounding words to resolve ambiguities, and displays the information that is determined to be the most likely to be relevant. The user can request additional information, in which case either the next most relevant information or all information about the selected word is provided. The dictionary can include information about multi-word combinations that include the selected word, and content determination can include checking whether the selected word is part of a predefined multi-word combination. The technique could be used with a thesaurus or a dictionary, including a dictionary used for translation.

SUMMARY OF THE INVENTION

The invention addresses problems that arise with conventional techniques for providing information about expressions in one language, where the information is understandable in another language. The problems relate to complexity of sentences and other expressions whose meanings can depend on relationships, not only between individual tokens such as words, but also between groups of tokens. For example, the meaning of a sentence may depend on the relationship between a noun phrase and a verb or predicate phrase. Sentences and other expressions whose meaning depends on relationships between two or more groups of tokens are referred to herein as "multi-token expressions".

Because of the various meanings an expression may have, a sentence that includes more than a few component expressions will have a very large number of possible translations, making it computationally difficult to consider all possible translations of the sentence. On the other hand, most sentences are neither identical nor nearly identical to a previously translated sentence, making it impractical in most situations to reuse previous translations of sentences. Conventional techniques thus tend to fall into three groups:

The first group includes automatic translation techniques, which attempt to translate sentences despite the computational difficulties of considering all possible translations. The techniques in the first group frequently make serious errors in translation, especially when applied to sentences that include expressions with multiple possible translations. The techniques in the first group typically discard information about ambiguities in order to obtain a translated result, making it impossible to recover from an error.

The second group includes machine aided translation tools and other techniques that find sentences that match or nearly match previously translated sentences, then retrieve the previous translation. Techniques in the second group are especially useful in the cases in which identical or nearly identical sentences occur frequently, but do not provide assistance the first time a new sentence occurs. Therefore, techniques in the second group are only useful in restricted contexts in which the chances of finding repetitions of similar sentences are reasonably high.

The third group of techniques does not attempt to automatically translate complete sentences. An example of this is LOCOLEX, described above, which displays a dictionary entry with one or more definitions of a selected expression, a technique analogous to an ordinary translating dictionary. Techniques in the third group can be quite helpful in aiding comprehension, but they have severe limitations. In LOCOLEX, for example, the user must have some knowledge of the first language in order to make appropriate selections In some cases, a dictionary entry does not provide sufficient information to allow the user to determine the meaning of a word or multi-word expression (MWE) in a specific context, much less the meaning of a sentence that includes the word or MWE.

The invention alleviates problems resulting from complexity of multi-token expressions, referred to herein as "complexity problems". The invention does so based on the surprising discovery that the meaning of a multi-token expression in a first language is often indicated by appropriately chosen translations of subexpressions into a second language, without attempting a complete, accurate translation of the multi-token expression.

The invention alleviates the complexity problem by providing techniques that rank a subexpression's translation choices. The techniques use the ranked translation choices to produce a sequence of translation choices, to indicate in the second language the meaning of the multi-token expression.

The techniques also make it possible to consider a subset of possible translations of a multi-token expression, the subset that includes the translation choices that are likely for each subexpression. In other words, information can be automatically or interactively presented indicating more than one sequence of translation choices for the multi-token expression, allowing the user to find one which seems most likely to indicate the meaning of the multi-token expression as a whole. This is especially useful if the sequence that includes the highest ranked translation choice for each subexpression does not indicate a plausible meaning for the multi-token expression. The user can, in effect, build another sequence that seems more likely to indicate the meaning even though it includes translation choices that are less highly ranked. These choices can also be propagated through a text, consistently changing the translation for any particular token or multi-token subexpression. They may also be captured to enable the system to provide better choices for future texts.

The techniques can be implemented in a method that obtains subexpressions of a multi-token expression in the first language. The method can obtain translation choices in the second language for a set of the subexpressions. Two or more translation choices can be for one subexpression. The method can rank a subset of the subexpression's translation choices, and can then use the ranked translation choices in producing a sequence of translation choices for the multi-token expression as a whole. The method can present information about the sequence to a user, indicating in the second language the meaning of the multi-token expression.

In obtaining subexpressions, the method can tokenize the multi-token expressions, and the subexpressions can include the resulting tokens. In obtaining translation choices, the method can then obtain a normalized form for each token and can then obtain one or more translation choices for the normalized form of each token. If a token is a multi-word expression, then method can use a multi-word expression lexicon to obtain translation choices. The method can obtain an inflection tag indicating a relation between a token and its normalized form and can use the inflection tag and normalized forms of translation choices to obtain surface forms of the translation choices, even for translation choices that are multi-word expressions.

In obtaining translation choices, the method can also obtain a set of alternative part-of-speech tags for each token, and use them to obtain a single part-of-speech tag for each token, such as by disambiguation. Then the method can use the single part-of-speech tags to group the tokens into token group subexpressions, analogous to phrases. The method can also obtain token group tags indicating types of token group subexpressions. The token group tags can be used to reorder translation choices within the portion of the sequence obtained for a multi-word expression or to reorder the portions of the sequence for two multi-word expressions.

Part-of-speech tags could also be used to rank translation choices. Translation choices could alternatively be ranked according to source, based on semantic context, or based on confidence levels that depend on how each translation choice was obtained. Ranking of translation choices could be automatic, or could be performed in accordance with a user signal selecting a ranking process.

The method can also search a translation memory for a previous translation of the multi-token expression, and can present information about the sequence of translation choices only if the search does not find a previous translation.

The method can present the sequence on a display. In response to a user signal selecting the translation choice presented for a subexpression, the method can produce and present a modified version of the sequence, with a different translation choice for the subexpression. If a user signal indicates a modification of the ranking of a subexpression's translation choices, and if the multi-token expression is an input text that includes a similar subexpression, the method can also modify the ranking of translation choices of the similar subexpression in accordance with the user signal. Where the method will be performed on a subsequent multi-word expression that includes a similar subexpression, the method can obtain a descriptor of the modification for use in modifying the ranking of the similar subexpression. The descriptor could, for example, indicate a rule applicable to the subexpression when it occurs in context similar to its context in the multi-token expression. Or, where ranking is based on confidence levels, the descriptor could indicate a weighting of confidence levels of translation choices.

The method can print the sequence of translation choices. The printed sequence can include the ranked set of translation choices for a subexpression.

The techniques can also be implemented in a machine with a processor that can access the multi-word expression and can provide information to user output circuitry for presentation to users. The process can operate to obtain subexpressions, obtain translation choices, rank translation choices, produce a sequence of translation choices, and provide information to the user output circuitry, as described above.

The techniques can also be implemented in an article of manufacture for use in a system that includes a multi-token expression, a storage medium access device, a processor, and user output circuitry. The article can include a storage medium and instruction data stored by the storage medium. The processor can receive the instruction data from the storage medium access device and, in executing the instructions, can operate as above.

The techniques can also be implemented in a method of operating a first machine to transfer instruction data as described above to the memory of a second machine that also includes user output circuitry and a processor. The processor of the second machine, in executing the instructions, can similarly operate as above.

In comparison with conventional machine translation techniques, the techniques provided by the invention are advantageous because they avoid the computational difficulties involved in translating entire sentences and other multi-token expressions. In addition, the inventive techniques can be extended to preserve sufficient ambiguity by saving two or more translation choices, and can therefore present two or more choices or allow a user to build a more likely translation of a multi-token expression using alternative translation choices.

In comparison with LOCOLEX and similar techniques, the techniques provided by the invention are advantageous because they can handle an entire multi-token expression rather than only a word or short multi-word expression, providing a sequence of translation choices that indicates the meaning of the multi-token expression. In addition, the inventive techniques can be extended to inflect or reorder translation choices, increasing the readability of a presented sequence of translation choices. The inventive techniques are not limited to obtaining translations from dictionaries, but can also be combined with conventional translation memory techniques to provide an alternative when a previous translation cannot be found. It may be possible to extend the inventive techniques to enable a person who is unfamiliar with a source language but has a strong facility in a target language to produce a reasonable translation of an input text in the target language.

The techniques provided by the invention are also advantageous because they can be extended to capture information about user choices and so be able to continually improve overall system performance. The techniques can also be extended to identify the domain in which user choices are made, allowing domain specific corrections.

The following description, the drawings, and the claims further set forth these and other aspects, objects, features, and advantages of the invention.

DETAILED DESCRIPTION OF THE INVENTION

A. Conceptual Framework

Figure 1:
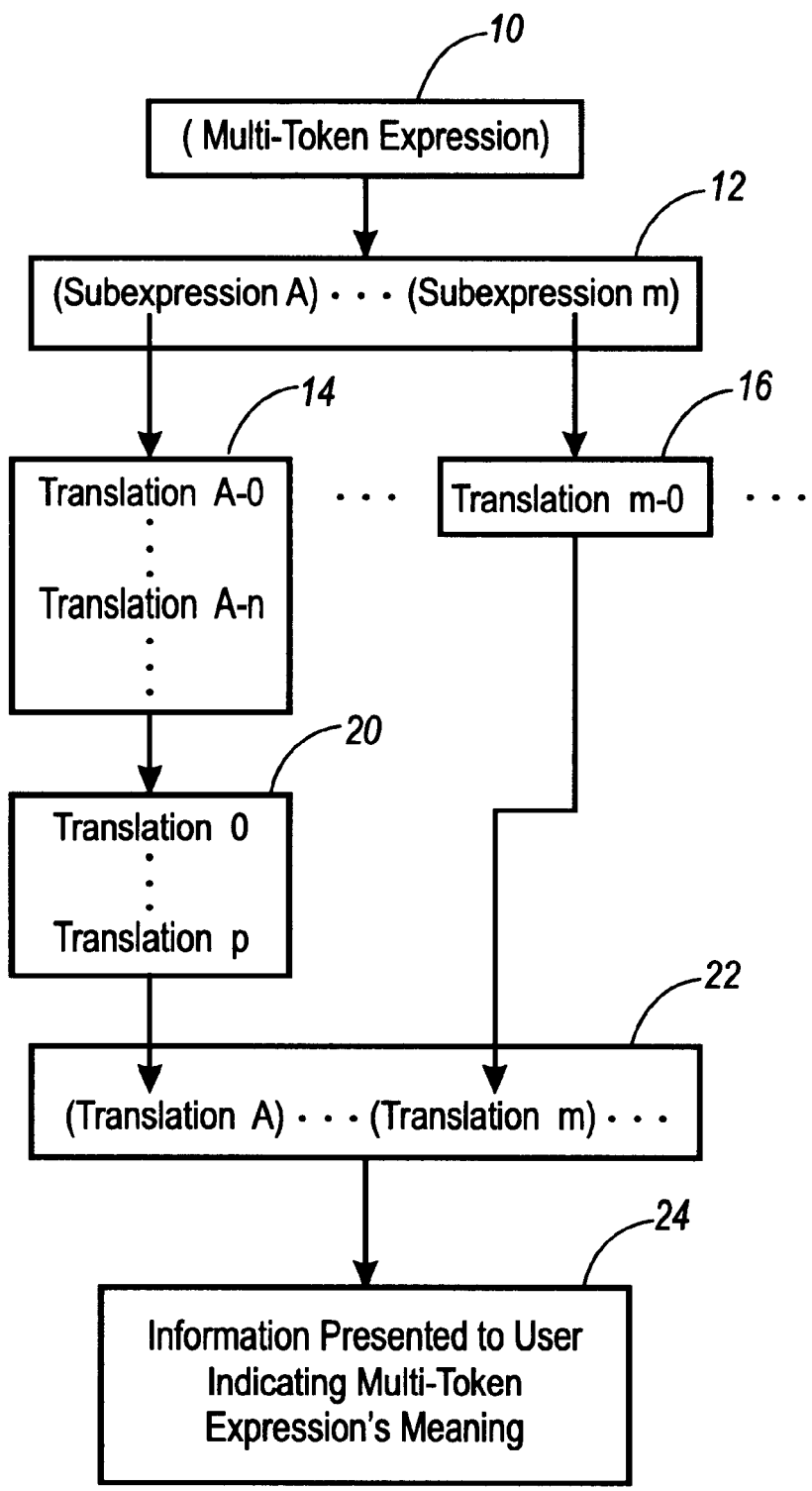
FIG. 1 is a schematic flow diagram showing how to obtain a sequence of translation choices for a multi-token expression in a first language, where information about the sequence can be presented to indicate the meaning of the expression in a second language.

The following conceptual framework is helpful in understanding the broad scope of the invention, and the terms defined below have the indicated meanings throughout this application, including the claims. In addition to the definitions set forth below, the definitions set forth in copending, coassigned U.S. patent application Ser. No. 09/222,549, entitled "Finding Selected Character Strings in Text", are incorporated herein by reference.

A processor performs an operation or a function "automatically" when it performs the operation or function independent of concurrent human intervention or control.

A "natural language" is an identified system of symbols used for human expression and communication within a community, such as a country, region, or locality or an ethnic or occupational group, during a period of time. Some natural languages have a standard system that is considered correct, but the term "natural language" as used herein could apply to a dialect, vernacular, jargon, cant, argot, or patois, if identified as distinct due to differences such as pronunciation, grammar, or vocabulary. The natural languages include ancient languages such as Latin, ancient Greek, ancient Hebrew, and so forth, and also include synthetic languages such as Esperanto and Unified Natural Language (UNL).

"Character" means a discrete element that appears in a written, printed, or phonetically transcribed form of a natural language. Characters in the present day English language can thus include not only alphabetic and numeric elements, but also punctuation marks, diacritical marks, blanks, spaces, capitalizations, tabulations and other format characters, mathematical and logical symbols, and other elements used in written, printed, or phonetically transcribed English. More generally, characters can include, in addition to alphanumeric elements, phonetic, ideographic, or pictographic elements.

As used herein, the notions of "word" and "separator" or "break" are closely related: A "separator" or "break" (or "word separator" or "word break") is a string of one or more elements that meets a criterion for separating words (a "break criterion"), while a "word" is a string of one or more elements, each of which is a character or a combination of characters, where the string does not include an internal separator according to the applicable break criterion. Break criteria applicable to languages such as French and English often treat strings of one or more spaces as word separators. In addition to correctly spelled words, abbreviations, acronyms, contractions, misspellings and nonsense words, mathematical and logical expressions including formulas and equations, combinations of punctuation marks that do not meet a break criterion (such as dotted lines, signature lines, "smileys", etc.), and various other types of strings of characters, whether or not semantically meaningful, can all be words under this definition if they do not include internal separators under an applicable criterion. Also, SGML and XML tags and other such strings of characters relating to hyperlinking, formatting, and so forth, are treated as words under some break criteria. To differentiate this meaning from the sense in which a word must be a semantic unit, words obtained by applying a break criterion are sometimes referred to herein as "tokens", and breaks between tokens may be referred to as "token breaks".

In addition to individual words, the term "token" also includes, however, combinations or sequences of words that are treated as atomic units in a particular implementation even though they include internal separators. For example, a set of tokens may include multi-word expressions (MWEs) that are translated as units rather than by translating the words they include.

A "text" is a series of characters that forms a series of words (or tokens) separated by separators. A text may be "defined", for example, by a written or printed series of characters or by an item of data that includes a series of character codes.

An "expression" refers to a type that applies to combinations of one or more tokens that can occur in a language: All instances of the same expression have equivalent tokens, though individual tokens may differ in appearance due to differences in inflection, case of characters, font, typeface, color, and so forth.

The "meaning" of an instance of an expression in a language refers to its semantic content to humans who understand the language. The meaning of an instance of an expression depends, however, on its context, so that an expression may have a number of different meanings, which can be referred to as its "senses". Instances of the same expression that occur in similar contexts are generally semantically equivalent, and therefore usually have the same sense.

A "multi-token expression" is an expression whose meaning depends on relationships between two or more groups of tokens. Examples include sentences and multi-sentence texts.

A "subexpression" is an expression that is part of another expression. For example, a multi-token expression may have several kinds of subexpressions, including types of tokens, phrases, clauses, and sentences.

A "token group subexpression" is a subexpression that includes a group of tokens, such as a phrase. A "token group tag" is a tag whose value indicates a type of token group, such as noun phrase or verb phrase.

A "chunk" is an instance of a token group subexpression that is less than one sentence and greater than one token. Examples include phrases, clauses, and instances of MWEs that are not tokens.

A "translation" of a first expression from a first language is a second expression in a second language that has approximately the same meaning to humans who understand the second language as the first expression has to humans who understand the first language.

A "translation choice" for a subexpression from a first language is a possible translation in a second language of the subexpression.

To "rank" translation choices is to place them in an order. Selecting one of a set of translation choices is a way of ranking a subset of the set. Another way is to select a subset of the translation choices that meet a criterion and place the subset in an order according to likelihood of being correct translations.

A sequence of translation choices is for a multi-token expression "as a whole" when the sequence of translation choices includes translations for sufficient subexpressions of the multi-token expression that the sequence could, in principle, indicate the meaning of the multi-token expression. Such a sequence could include more than one translation choice for some of the subexpressions. Whether the sequence does in fact indicate the meaning of the multi-token expression depends on the particular translation choices included in the sequence.

The term "information about" a thing, as in "information about a sequence of translation choices", is intended to include not only all or part of the information from the thing, but also information abstracted or otherwise derived from the thing.

Information about a sequence of translation choices "indicates in a second language the meaning" of an expression in a first language if the information, when presented to a user who understands the second language, conveys a meaning that is the same as the meaning of the expression in the first language.

B. General Features

Figure 2:
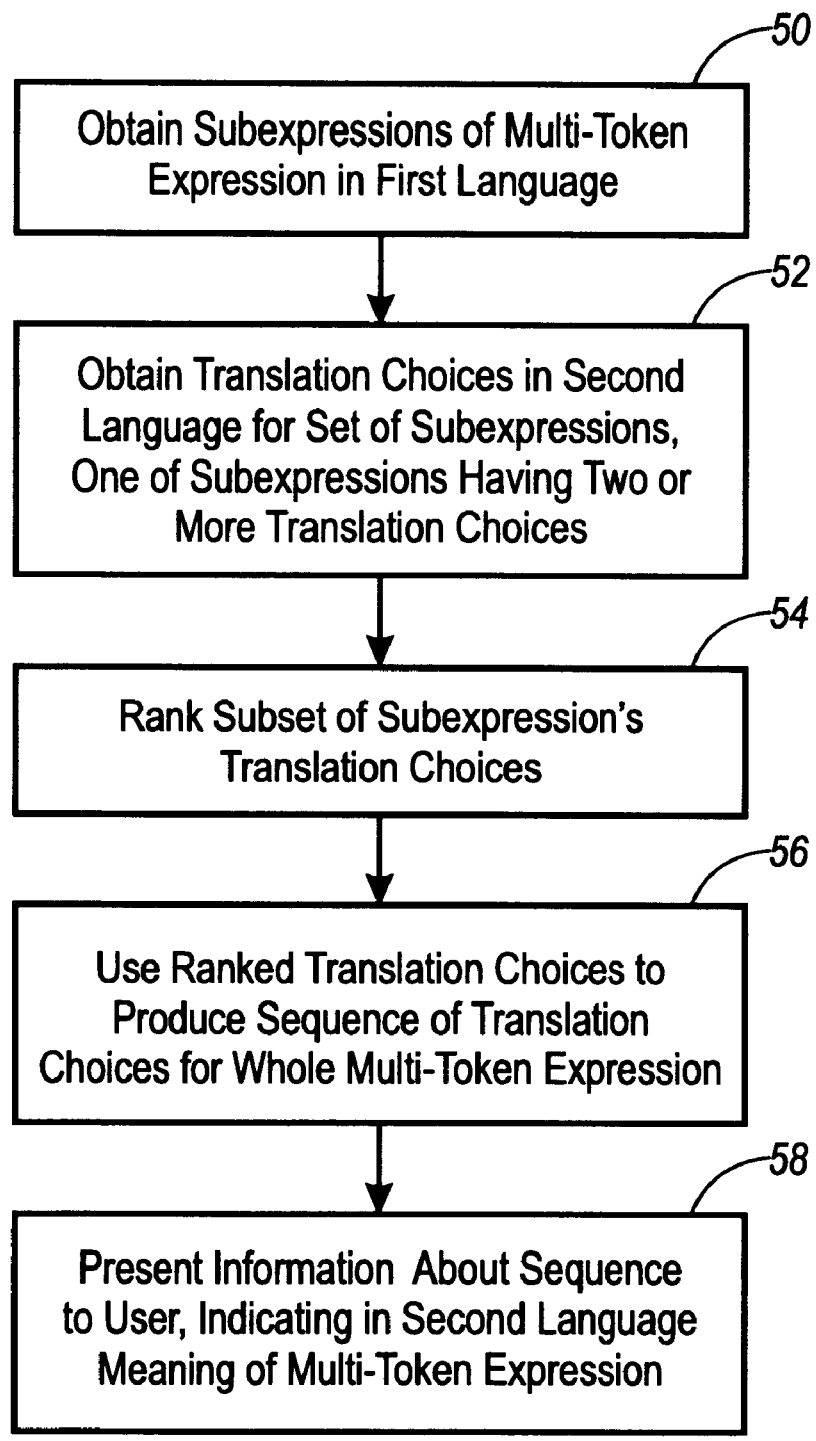
FIG. 2 is a flow chart showing general acts in obtaining a sequence of translation choices for a multi-token expression in a first language, where information about the sequence can be presented to indicate the meaning of the expression in a second language.
Figure 3:
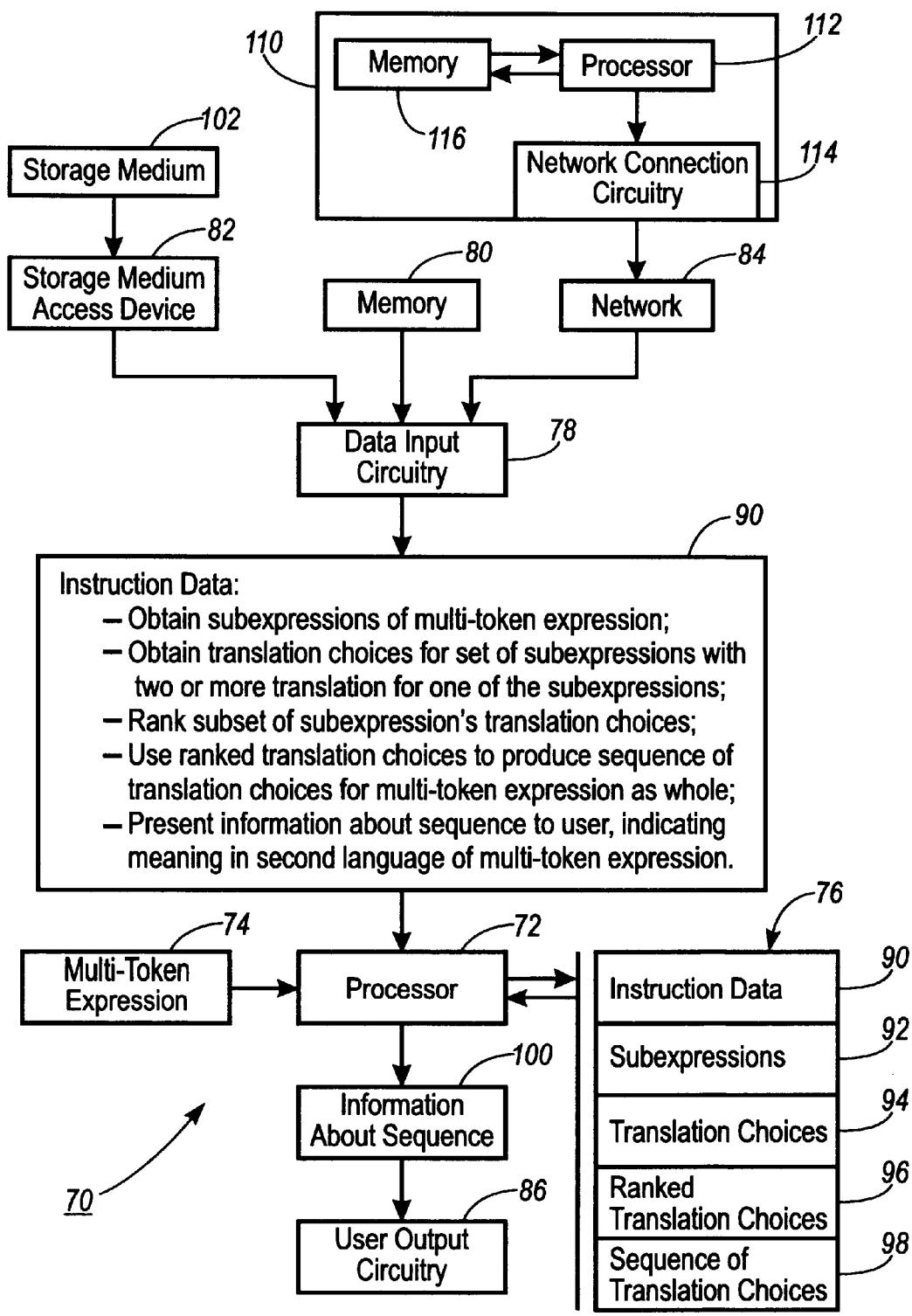
FIG. 3 is a schematic diagram showing components of a system that can perform the general acts in FIG. 2.

FIGS. 1–3 illustrate general features of the invention.

FIG. 1 is a flow diagram that shows schematically how to obtain a sequence of translation choices for a multi-token expression in a first language, where information about the sequence can be presented to indicate the meaning of the expression in a second language.

Multi-token expression 10 in the first language illustratively has two or more subexpressions 12, of which subexpression A and subexpression m are shown. When subexpressions 12 have been obtained, a set of translation choices in the second language can be obtained for a set of the subexpressions. The set of translations can include translation choices 14 for subexpression A and translation choices 16 for subexpression m. Translation choices 14 include two or more translation choices, illustratively including translation A-0 and translation A-n. Translation choices 16, on the other hand, may only include translation m-0.

As illustrated, a subset of translation choices 14 can be ranked to obtain ranked subset 20. Ranked subset 20 illustratively includes translation 0 through p, which may include some or all of translation choices 14.

Ranked subset 20, together with translation choices for other subexpressions, can then be used to obtain a sequence of translation choices 22. Sequence 22 illustratively includes translation A for subexpression A and translation m for subexpression m. Information 24 about sequence 22 can then be presented to a user to indicate in the second language the meaning of multi-token expression 22.

In FIG. 2, the act in box 50 obtains subexpressions of a multi-token expression in a first language. The act in box 52 obtains translation choices in a second language for a set of the subexpressions, with one of the subexpressions having two or more of the translation choices. The act in box 54 ranks a subset of the subexpression's translation choices.

The act in box 56 then uses the ranked translation choices to produce a sequence of translation choices for the multi-token expression as a whole. Finally, the act in box 58 presents information about the sequence to a user. The presented information indicates in the second language a meaning of the multi-token expression.

Machine 70 in FIG. 3 includes processor 72 connected for accessing multi-token expression 74 in a first language and also connected for accessing data in memory 76. Processor 72 is also connected for receiving data through data input circuitry 78, which can illustratively provide data received from connections to memory 80, storage medium access device 82, or network 84. Processor 72 therefore could be the central processing unit (CPU) of a personal computer, workstation, or server, or any other processing device with connections as shown.

Multi-token expression 74 can take any appropriate form, such as a series of character codes defining a sentence or other multi-token expression. Multi-token expression 74 could be obtained from any appropriate source, including user input circuitry (not shown), memory 76, or data input circuitry 78.

Processor 72 can also be connected for providing information through user output circuitry 86, which could provide information to output devices such as displays and printers.

Instruction data 90 is illustratively provided by data input circuitry 78, and can be stored in memory 76 for execution. In executing the instructions indicated by instruction data 90, processor 72 obtains subexpressions 92 of multi-token expression 74. Then processor 72 obtains translation choices 94 in a second language for a set of subexpressions 92. Two or more of the translation choices are for one of the subexpressions. Processor 72 then ranks a subset of the subexpression's translation choices, and uses ranked translation choices 96 to produce sequence of translation choices 98 for multi-token expression 74 as a whole. Finally, processor 72 presents information 100 about sequence 98 to a user through user output circuitry 86, and information 100 indicates in the second language a meaning of multi-token expression 74.

As noted above, FIG. 3 illustrates three possible sources from which data input circuitry 78 could provide data to processor 72—memory 80, storage medium access device 82, and network 84.

Memory 80 could be any conventional memory within machine 70, including random access memory (RAM) or read-only memory (ROM), or could be a peripheral or remote memory device of any kind.

Storage medium access device 82 could be a drive or other appropriate device or circuitry for accessing storage medium 102, which could, for example, be a magnetic medium such as a set of one or more tapes, diskettes, or floppy disks; an optical medium such as a set of one or more CD-ROMs; or any other appropriate medium for storing data. Storage medium 102 could be a part of machine 70, a part of a server or other peripheral or remote memory device, or a software product. In each of these cases, storage medium 102 is an article of manufacture that can be used in a machine.

Network 84 can provide data from machine 110. Processor 112 in machine 110 can establish a connection with processor 72 over network 84 through network connection circuitry 114 and data input circuitry 78. Either processor could initiate the connection, and the connection could be established by any appropriate protocol. Then processor 112 can access data stored in memory 116 and transfer the data to processor 72 over network 84. Processor 72 can store the data in memory 76 or elsewhere. If the data includes instruction data 90, processor 72 can then execute the instructions to perform operations as described above.

C. Implementations

The general features described above could be implemented in numerous ways on various machines to automatically search text to find character strings that match a list of selected strings. The implementations described below have been implemented on Sun workstations running under Solaris and executing code compiled from C++ source code and on PCs running under Windows NT and executing code compiled or interpreted from a combination of C++ and Java source code.

C.1. Overview

Figure 4:
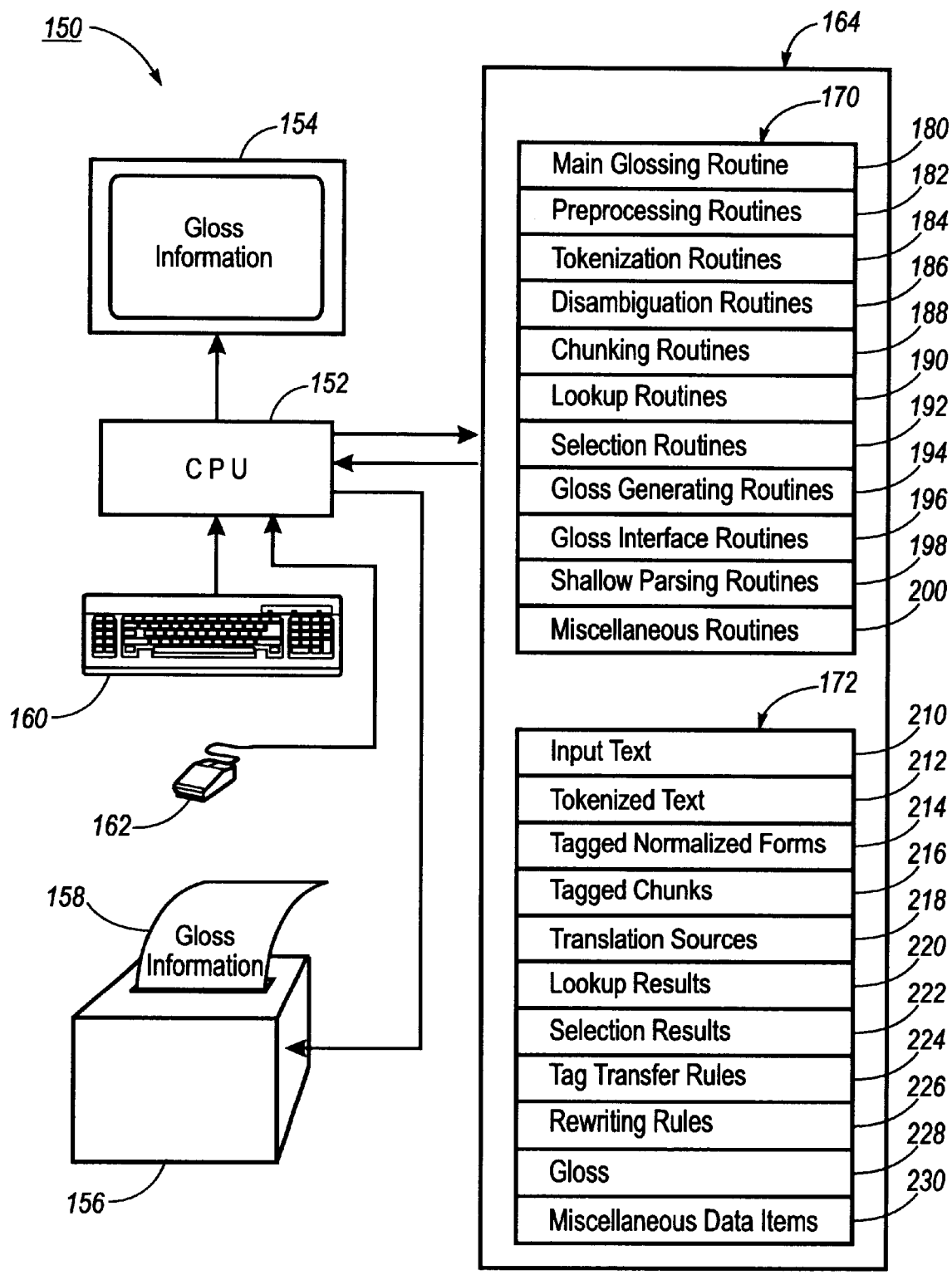
FIG. 4 is a schematic diagram of a system implementing features in FIGS. 2 and 3.

In FIG. 4, which illustrates a representative implementation, system 150 includes the central processing unit (CPU) 152 of a Sun workstation or PC. CPU 152 is connected to display 154 and printer 156 for presenting images and to keyboard 160 and mouse 162 for providing signals from a user. Display 154 illustratively presents an image of gloss information on its screen, while printer 156 is presenting a printed image of gloss information on sheet 158. CPU 152 is also connected so that it can access memory 164, which can illustratively include program memory 170 and data memory 172.

The routines stored in program memory 170 can be grouped into functions, several of which are illustrated-main glossing routine 180, preprocessing routines 182, tokenization routines 184, disambiguation routines 186, chunking routines 188, lookup routines 190, selection routines 192, gloss generating routines 194, gloss interface routines 196, shallow parsing routines 198, and miscellaneous routines 200. FIG. 4 also shows several items of data stored in data memory 172 and accessed by CPU 152 during execution of routines in program memory 170—input text 210, tokenized text 212, tagged normalized forms 214, tagged chunks 216, translation sources 218, lookup results 220, selection results 222, tag transfer rules 224, rewriting rules 226, gloss 228, and miscellaneous data items 230, some of which are described below.

Figure 5:
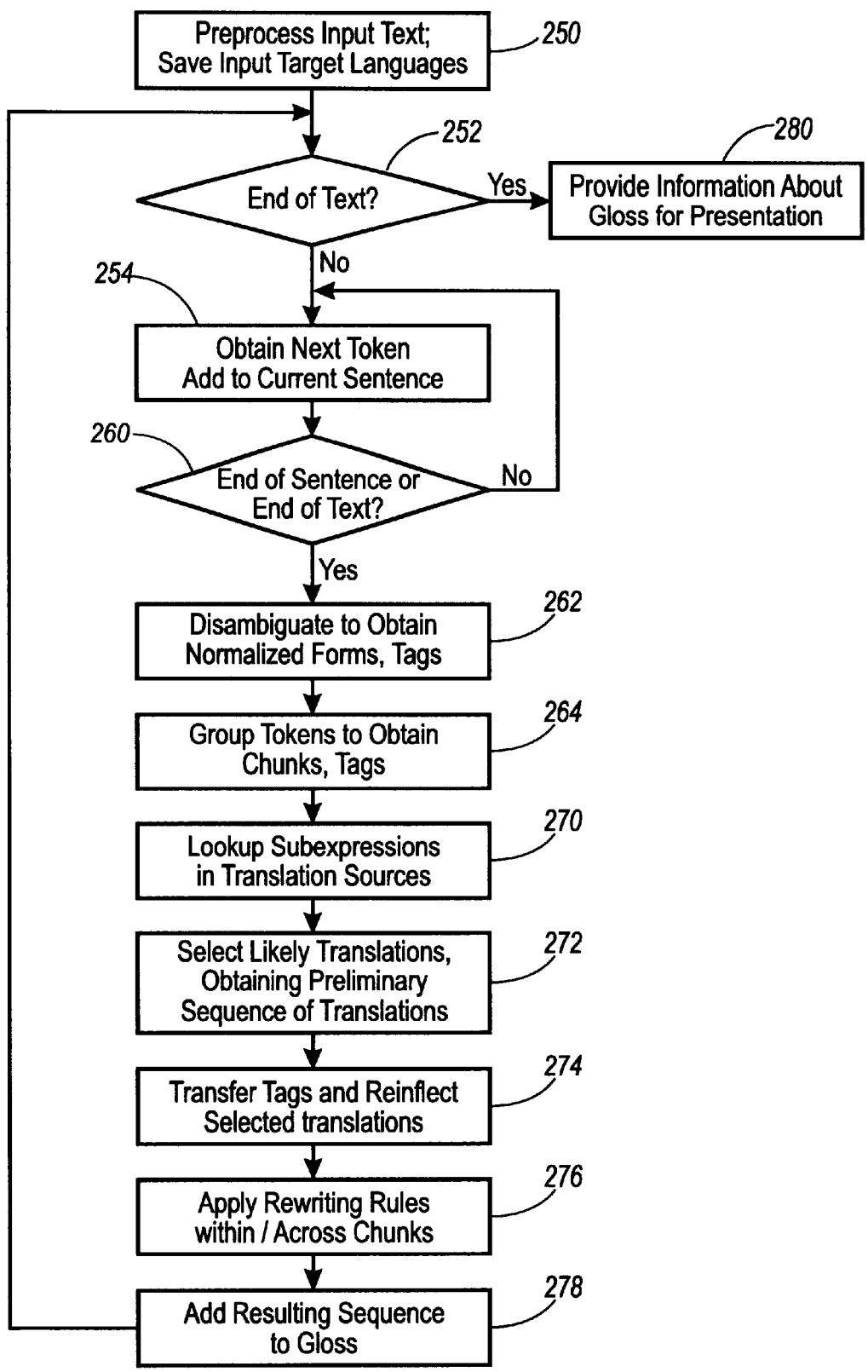
FIG. 5 is a flow chart showing acts performed by the system of FIG. 4.

FIG. 5 shows general acts that can be performed in an implementation of main glossing routine 180.

The act in box 250 begins by calling preprocessing routines 182 to prepare input text 210 for further operations and to save information indicating the input and target languages. In a dedicated system, the input and target languages may be fixed, so that it is only necessary to continue to save existing information. But for a general system capable of handling various input and target languages, items of data in miscellaneous data items 230 can include items indicating the input and target languages, which can be obtained from a user or with language identification as described below.

Depending on the source of input text 210, it may include formatting information and logical structure such as SGML or HTML tags, paragraph breaks, lists, etc. Preprocessing routines 182 can include a conventional routine that extracts formatting information and logical structure to be reused in subsequently presenting a gloss of input text 210 to a user.

Preprocessing routines 182 can also include a language guessing routine that guesses the language of input text 210, referred to herein as the input language. This routine is useful if a user is not sure about the origin of input text 210, such as if input text 210 is a document automatically retrieved as a result of a search of the World Wide Web ("Web"). The language guessing routine can be implemented as described in copending, coassigned U.S. patent application Ser. No. 09/219,615, entitled "Automated Language Identification Using Both N-Gram and Word Information", and Ser. No. 09/221,232, entitled "Executable for Requesting a Linguistic Service", both incorporated herein by reference. The language from user input or from automatic language guessing can be saved in miscellaneous data items 130 and can then be used to select appropriate routines or other tools for performing subsequent operations in FIG. 5.

The act in box 252 then begins an outer iterative loop that handles each sentence from input text 210 until the end of text is found. Box 254, in turn, begins an inner iterative loop that finds each atomic substrings or "token" within the current sentence, by calling tokenization routines 184 to obtain the next token.

Tokenization could be performed in various ways, all of which segment a string of character codes from input text 210 into tokens that represent minimal linguistic units for subsequent processing, in this case for glossing. Simple tokens can represent words, punctuation marks, and markup tags. Complex tokens can represent multiword expressions (MWEs) describable by regular expressions, such as numeral sequences, dates, complex time expressions, function word sequences that serve as conjunctions or prepositions, adverbials such as for dates or times, idioms, names, addresses, or specialized terminology such as technical terms.

Complex tokenization may be extended to segment more general classes of strings, such as tokens that represent phrases stored in a translation memory or collocations extracted from bilingual corpora. If these techniques are used, a sentence might lead to more than one tokenization, such as where a tokenizer recognizes overlapping complex tokens resulting from various entries in a translation memory. As discussed below in relation to selection, overlapping tokens could be taken into account in selecting translations, but for greater speed or ease of implementation it can be advantageous to apply a criterion that retains only one of overlapping tokens, such as by retaining only the largest token.

All of the kinds of tokens described above could be obtained using conventional techniques, such as those described in Chanod, J.-P., and Tapanainen, P., "A Non-Deterministic Tokeniser for Finite-State Parsing", presented at ECAI '96 Workshop on "Extended finite state models of language", Budapest, 1996, and Grefenstette, G., and Tapanainen, P., "What is a Word, What is a Sentence? Problems of Tokenization", in *Proceedings of The 3rd International Conference on Computational Lexicography* (COMPLEX'94), ISBN 963 8461 78 0, Research Institute for Linguistics, Hungarian Academy of Sciences, Budapest, 1994, pp. 79–87, incorporated herein by reference.

The act in box 254 also adds the token to the current sentence, which is included in tokenized text 212. Then, the act in box 260 branches based on whether an end of sentence or end of text has been found. If not, the act in box 254 is again performed to begin the next inner iteration.

When an end of sentence or end of text has been found, the act in box 262 calls disambiguation routines 186 to perform disambiguation on the tokens of the current sentence. Routines 186 obtain, for each token, a normalized form and a set of one or more tags that includes a part-of-speech (POS) tag. For example, if a word is ambiguously a noun or a verb, disambiguation will obtain a POS tag indicating noun or verb, depending on which is more likely in the context. The tags can also include additional morphosyntactic information for the token, such as inflection tags.

The normalized form for a token, such as the singular for nouns or the infinitive for verbs, must provide a form that can be used to access some of translation sources 218, such as bilingual dictionaries. It may be necessary to obtain normalized forms of MWEs for some such dictionaries.

The results from box 262 are included in tagged normalized forms 214, which can include, in addition to POS tags, other tags for subsequent use. For example, as explained in greater detail below, translations obtained from some of translation sources 218 will also be in normalized form, and will therefore be reinflected in accordance with inflection tags obtained in box 262 before presentation to a user.

Disambiguation could be implemented using various conventional techniques, including those described in WO-A-99/01828, entitled "FSTs Approximating Hidden Markov Models and Text Tagging Using Same", incorporated herein by reference. Techniques that can be used to normalize MWEs are described in U.S. Pat. No. 5,642,522 and in the Bauer et al. article cited above, both incorporated herein by reference.

The act in box 264 calls chunking routines 188 to use the disambiguated POS tags from box 262 to group tokens into larger subexpressions of the current sentence referred to herein as "chunks". For example, the act in box 264 can obtain nominal, prepositional, verbal, and adverbial chunks, and each chunk can have one or more tags, such as morphosyntactic tags indicating whether it is a subject, an object, etc. The act in box 264 can also disambiguate the tags based on agreement relations within or across chunks, and can mark clause boundaries. The results from box 264 can then be included in tagged chunks 216.

The act in box 264 could be implemented using various conventional techniques, including iterative techniques that employ finite state networks. Or the acts in boxes 254, 256, 260, 262, and 264 could all be implemented with calls to shallow parsing routines 198, which can be implemented as described in Aït-Mokhtar, S., and Chanod, J.-P., "Incremental finite-state parsing", in *Proceedings of Applied Natural Language Processing* 1997 (ANLP '97), Washington, D.C., April 1997, and Grefenstette, G., "Light Parsing as Finite-State Filtering", *Proceedings ECAI'96 Workshop on Extended Finite-State Models of Language*, Budapest, 11–12 August 1996, both incorporated herein by reference.

The act in box 264 could also be extended to perform discontinuous tokenization, obtaining non-sequential MWEs and idioms. Experimental techniques for discontinuous tokenization have been implemented in LOCOLEX, described above.

The acts in boxes 254, 256, 260, 262, and 264 implement the act in box 50 in FIG. 2 for the current sentence, and could all be performed automatically. The subexpressions obtained include simple and complex tokens, chunks, and the sentence itself. Translations can then be obtained for a subset that includes some or all of the subexpressions of the current sentence.

The act in box 270 calls lookup routines 190 to look up a subset of the subexpressions of the current sentence in translation sources 218, obtaining translations in the target language. Translation sources 218 can include conventional sources such as translation memory, multiword databases, or single word dictionaries, both general and domain specific. A number of different translations can be obtained for the subexpressions, and multiple translations can be obtained for some subexpressions. The results from box 270 can be included in lookup results 220.

The act in box 270 thus implements the act in box 52 in FIG. 2 for the current sentence, and can be performed automatically. An automatic technique implementing the act in box 270 is described in greater detail below.

The act in box 272 calls selection routines 192 to select likely translations for subexpressions with more than one translation from box 270, thus obtaining a preliminary sequence of translations for the sentence as a whole. As used here, the term "select" is an example of ranking the translations, because it means that a most likely translation is selected and possibly also a second most likely translation, a third most likely, and so forth.

The act in box 272 thus implements the act in box 54 in FIG. 2 for each subexpression with more than one translation from box 270, and also implements the beginning of the act in box 56. Various techniques that could be used in implementing the act in box 272 are described in greater detail below. As will be understood from the discussion below, selection in box 272 could be performed automatically, but, in some implementations, the user can control selection.

The act in box 274 calls gloss generating routines 192 to apply any relevant tag transfer rules 224 to the preliminary sequence of ranked translations from box 272. The act in box 274 can use a tag transfer rule to obtain a set of transferred inflection tags in the second language for a translation and can then reinflect the translation according to the transferred inflection tags. Where a subexpression has more than one translation that could be reinflected in box 274, reinflection could be attempted for all ranked translations, or only for a subset of more highly ranked translations.

The act in box 276 calls gloss generating routines 192 to apply any relevant rewriting rules 226 to the preliminary sequence of ranked translations from box 272, as modified in box 274. The act in box 276 can use a rewriting rule to obtain a reordered version of a subsequence of translations, either within a chunk or across chunks.

The act in box 278 then calls gloss generating routines 192 to add the resulting sequence of ranked translations for the current sentence to gloss 228. The resulting sequence is the preliminary sequence from box 272, as modified in boxes 274 and 276. When complete, gloss 228 provides a gloss for input text 210 as a whole.

The acts in boxes 272, 274, 276, and 278 thus implement the act in box 56 in FIG. 2 by producing a sequence of translations for the current sentence as a whole, and can be performed automatically. Techniques that could implement the acts in boxes 272, 274, and 276 are described in greater detail below.

When the end of input text 210 is reached in box 252, the act in box 280 calls gloss interface routines 196 to output information about gloss 228 for presentation to a user, either through the screen of display 154 or through printer 156. The information about gloss 228 that is presented to the user indicates the meaning of input text 210 in the target language.

The act in box 280 thus implements the act in box 58 in FIG. 2. Techniques that could be used in implementing the act in box 280 are described in greater detail below. As will be understood from the discussion below, information could be automatically provided in box 280, but, in some implementations, the user can control the manner in which information is provided.

C.2. Lookup

As explained above, several kinds of subexpressions are obtained, including tokens, MWEs, and the entire sentence. In addition, translation sources 218 can include a variety of sources, some of which are only appropriate for certain subexpressions.

The act in box 270 could be implemented in a routine that performs lookup automatically in response to a call with a set of subexpressions and, for each subexpression, an indication of its type. The routine could perform an iterative loop in which each iteration handles one of the subexpressions until all of the subexpressions have been handled.

If a subexpression is a sentence or another subexpression that is at least a phrase, the routine could provide the subexpression in queries to translation memories. If one or more results are received, the routine could assign a high confidence level to each result, because translation memory results have a high probability of being correct. The routine could also store an identifier of the source of each result, because different translation memories may have different probabilities of correctness.

If a subexpression is less than a clause but includes more than one token, the routine could provide the subexpression in queries to MWE lexicons, such as translating finite state transducers (FSTs) and databases of collocations with their translations.

If one or more results are received, the routine could assign a medium confidence level to each result, because MWE lexicons generally have a lower probability than translation memories of being correct, but still quite high. The routine could also store an identifier of the source of each result, because different MWE lexicons have different probabilities of correctness.

If a subexpression is only one token, the routine could provide the token in queries to token-level lexicons, such as general and domain specific bilingual dictionaries and specialized lexicons for dates, numerals, and preferred translations. For tokens that have POS tags, the query could include the POS tag, so that the translation sources can return only results for the indicated POS. If one or more results are received, the routine could assign a low confidence level to each result, because token-level lexicons generally have the lowest probability of being correct, although a semantically nonambiguous token may have a medium probability of correctness, like an MWE.

The confidence level could be adjusted in accordance with the results of disambiguation in box 262: Tokens that can be fully analyzed should have higher confidence than tokens that can only be partially analyzed, such as for agreement and tense. Prepositions generally have low confidence.

Various types of confidence level values for the translations of a subexpression, with some of the fields of the matrix being correlated or otherwise related. Different weightings could be applied to different confidence level values depending on the type of the subexpression, including whether its type is token, a chunk, or a sentence, and also including its type as indicated by POS and other tags. Confidence level values could differ for translations obtained based on semantic attributes of the subexpression, e.g. its gender, number, tense, and agreement, as opposed to its semantic attributes, e.g. by disambiguating its senses.

As for other types of subexpressions, the routine could also store an identifier of the source of each result, because different token-level lexicons have different probabilities of correctness.

C.3. Selection

The lookup results from box 270 typically include more than one translation for at least one subexpression. This may occur for a number of different reasons: The subexpression may be a token for which a lexicon provides a number of alternative translations; or the subexpression may be nested within another, larger subexpression, and a lexicon may provide one translation for the subexpression while another lexicon or a translation memory may provide another translation for the larger subexpression; or the subexpression may be a complex token that overlaps with another complex token, both of which have translations.

The act in box 272 could be implemented with main selection routine that is called with the subexpressions and the lookup results, or a subset for which selection is required because there is more than one translation for a subexpression in any of the ways mentioned above. The main selection routine can, in turn, call a default selection routine to perform selection automatically if no user signals have been received indicating that selection should be performed differently. User signals controlling selection could be of various kinds, with some kinds simply modifying parameters of the default selection routine, others specifying alternative subroutines to replace those otherwise called by the default routine, others providing routines to replace the default routine, and so forth.

The default selection routine could begin by testing whether user signals controlling selection have been received. If so, the default routine could make modifications as specified by the user control signals, such as by changing its parameters or subroutines or by calling a replacement routine.

Absent a replacement routine, the default routine could continue by testing whether the top level subexpression, typically a sentence, has at least one result from translation memory. If there is more than one such result, the default routine could choose one result based on a default ranking of translation memories, which the user could modify interactively. The default routine could return the translation memory result as the selected translation of the whole sentence unless the user has indicated that a gloss should be generated even though a complete result is obtained from translation memory.

If it does not complete by returning a translation memory result, the default routine can continue by testing whether tokenization of the current sentence is ambiguous due to overlapping complex tokens. If so, the default routine can select a best tokenization path using a default criterion such as largest non-overlapping token, which is computationally simple, or best translation result, which could be determined by comparing confidence levels or translation sources, preferring a translation from translation memory or a terminology lexicon for the domain rather than word by word from a general bilingual dictionary. Other possible default criteria include smallest number of tokens or smallest number of translation alternatives. Alternatively, a user provided criterion could be used. Selection of a best tokenization path has the effect of selecting translations that are consistent with the path and rejecting others, which can be accomplished by disregarding any subexpression that does not occur on the best tokenization path.

When it has a single tokenization path, the default routine can test whether any instances of nested translations occur along the path. This test could be made in various ways based on types of subexpressions and relations between their beginning and ending points within the current sentence. If an instance of nesting is found, the default routine could select the translations of the most encompassing subexpression unless the user has indicated another criterion for selecting among nested translations. For example, the user might have indicated that the selection should be based on confidence levels or translation sources. Or the user could specify that an encompassing subexpression and tokens nested within it would all be retained.

When the default routine has selected which nested translations to retain, the result will be a set of subexpressions, each with a set of translations. Therefore, the default routine can continue by selecting, for each subexpression, an appropriate subset of its translations.

Unless the user has specified another approach, the default routine could compare confidence levels of a subexpression's translations and select those with the highest confidence level available. As noted above, the confidence levels could be assigned depending on how each translation was derived in box 270.

Then, the default routine could compare the translation sources of the highest confidence translations, selecting a single translation source according to a default ranking or a user specified ranking of translation sources. For example, a dedicated lexicon that provides specific or restricted translations for a small set of tokens or subexpressions would ordinarily be given a relatively high ranking. In effect, this provides a form of lexical selection. The user could specify that a ranking of translation sources applies generally or that it applies only to certain specified tokens or subexpressions; for example, a special ranking could be provided for polysemic words for which general lexicons provide frequent as well as rare or misleading meanings.

Finally, if the selected translation source provided more than one translation and unless the user has specified an alternative approach, the default routine could simply select the first translation provided or an ordered list of the first N translations provided, where N is a user specified value and where each translation's position in the ordered list indicates its ranking.

Among alternative approaches a user could specify are various types of syntactic selection, semantic selection, textual analysis, and so forth. Miscellaneous routines 200 could include various selection routines among which a user could choose.

Syntactic selection could rely on tags obtained in boxes 262 and 264. As noted above, some syntactic selection among dictionary definitions could be implicitly performed during lookup in box 270, by providing only definitions matching a POS tag obtained in box 262. But additional tags indicating, for example, case marking or prepositions, could be used in syntactic selection based on lexical and contextual information, such as by sub-categorization.

Semantic selection could also make use of tags from boxes 262 and 264, in accordance with techniques described in copending, coassigned U.S. patent application Ser. No. 09/YYY,YYY entitled "Type-Based Selection of Rules for Semantically Disambiguating Words", incorporated herein by reference. As described there, context-based rules derived from examples in a dictionary can be applied to select among the senses of a word. Where multiple rules apply to the context in which a word appears, a rule can be selected based on the type of the rule. A word-level rule can be selected over a class-level rule. Within a level, rules can be selected based on a priority ranking of example types.

Other types of semantic selection can be based on an automatic or user-defined selection of domain specific lexicons or of a domain of a text or subexpression; for example, automatic analysis or a user signal indicates the domain is technical, senses that relate to technical domains are selected and other senses are not. Still other types can select consistent semantic fields at sentence, paragraph, or text level.

Textual analysis can automatically obtain frequencies of tokens and of co-occurrences or collocations, and selection can also be based on these.

The default selection routine, as described above, would produce, for each of the selected set of subexpressions that has at least one translation, a ranked list of one or more translations. The routine would thus form a preliminary sequence of translations for the sentence as a whole.

User control over selection could be achieved with various user interface techniques. Selection criteria could be interactively defined by a user or the user could provide encoded selection criteria to be preloaded. For an interactive user interface, a user could have the option of choosing, on a gross level, a single selection routine to be applied to the translations of all subexpressions, or, on a fine level, a selection routine to be applied to a specific section, sentence, phrase, or word. Alternatively, the user can choose the extent to which selection goes; for example, every translation could be retained in the gloss unless the user specifies a criterion that removes it.

C.4. Gloss Generation

As described above, the acts in boxes 274, 276, and 278 serve to generate the gloss, a relatively complex data structure that holds a sequence of selected translations for a text as a whole. Several other acts in FIG. 5 provide information that can be included in a gloss, however, and the gloss could be generated in many different ways, depending on the nature and quantity of information it holds.

Figure 6:
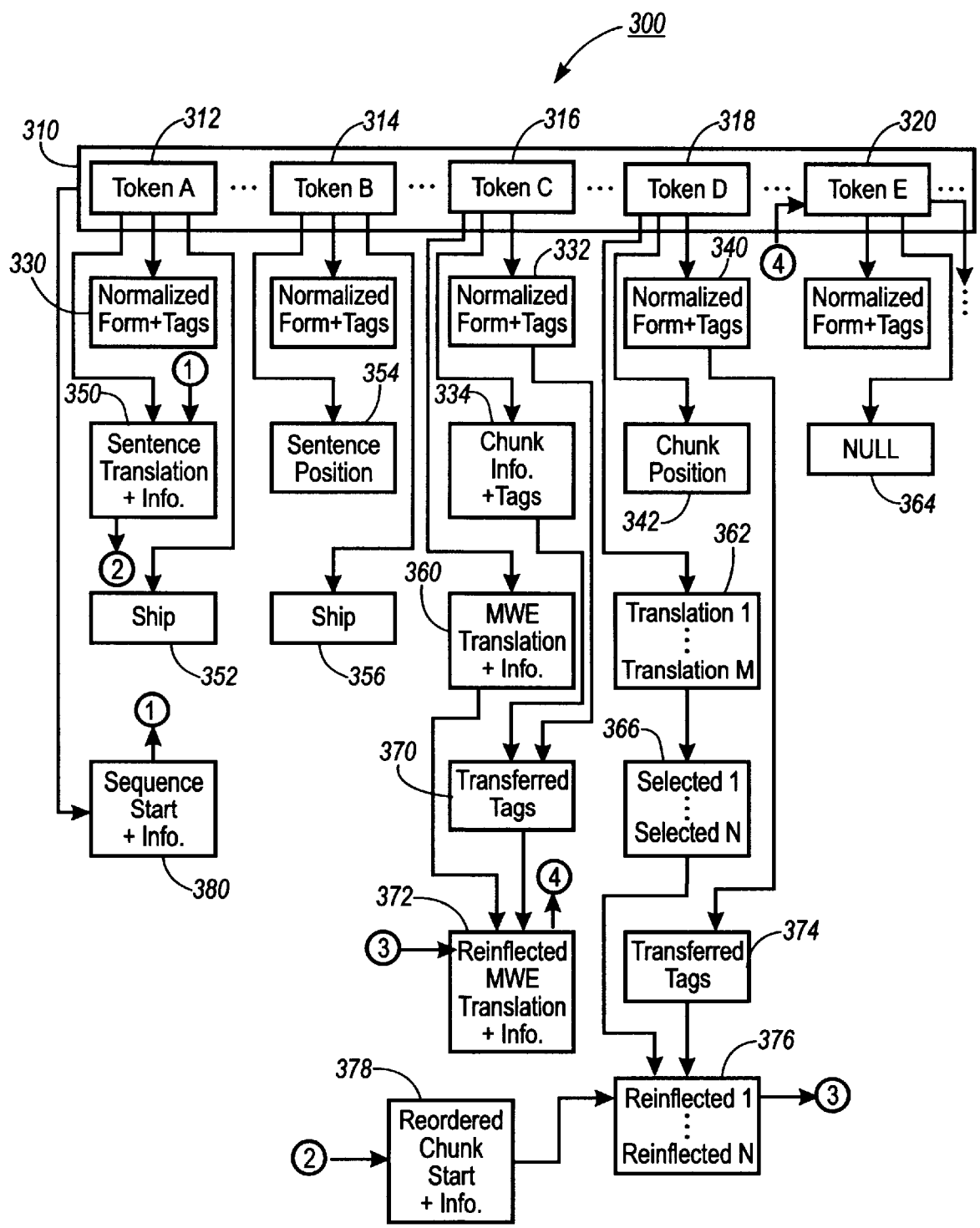
FIG. 6 is a schematic diagram of a gloss produced by performing acts like those in FIG. 5.

FIG. 6 illustrates features that a gloss can have. The illustrated features are merely representative, however, because glosses could be structured in many different ways, and could include more or less information than the gloss shown in FIG. 6.

Gloss 300 in FIG. 6 is built around list 310, which represents input text 210 and includes token items 312, 314, 316, 318, and 320, representative items of data that illustrate features of gloss 300, as described below. In addition, list 310 could include formatting or structure information obtained in box 250, in which case it could be used to reconstruct input text 210.

Each token item in list 310 represents a token resulting from tokenization in box 254 in FIG. 5. Each token item can therefore include a character string (not shown) from input text 210 and can also include additional information about the token it represents such as the character string's length and starting position within input text 210 and the token's position within a sentence. In addition, each token item can have, either directly through encoding in the token item or indirectly through indexes, pointers, or the like, a variety of associated information obtained in the operations in boxes 262 through 278 in FIG. 5. For example, an empty array of objects could be set up to hold the associated information, and each token item could be assigned an index into the array. All results could be held in the array, even if only temporarily until used by subsequent operations; for example, candidate parts of speech from morphological analysis could be held in the array until collapsed to a single part of speech or a small set of parts of speech by disambiguation.

As shown, the associated information of each token item includes a disambiguation item indicating its normalized form and tags obtained in box 262, which could include not only morphosyntactic tags but also semantic tags indicating probable domain or other semantic characteristics of the token. Disambiguation item 330, for example, is for token item 312, representing a token designated "A".

Token item 316, representing a token designated "C", has disambiguation item 332, but also has chunk item 334, which includes information obtained in box 264 about a chunk that begins with token C, such as its length or, if a nonsequential chunk, its members. Chunk information 334 can also include one or more tags indicating morphosyntactic or semantic characteristics of the chunk. Token item 318, representing a token designated "D", similarly has disambiguation item 340, but also has chunk position item 342 with information obtained in box 264, indicating the position of token D in the chunk that begins with token C.

The associated information of each token also includes results from lookup in box 270 in FIG. 5. The information included in gloss 300 depends on how lookup is performed in box 270, but FIG. 6 illustrates several examples that could be obtained if lookup is performed as described above.

Token A is the first token of a sentence for which a previous translation was obtained from a translation memory. The previous translation could have been obtained by reconstructing the sentence from the normalized forms of its tokens and then provided the reconstructed sentence in a query to the translation memory. Therefore, sentence translation item 350 is associated with token item 312, indicating the previous translation and possibly also including additional information, such as the original sentence's length in tokens, as well as a confidence level value and an identifier of the translation source. Token item 312 also has associated skip item 352, indicating that no other lexicon or dictionary translations were obtained for token A because it is in a sentence for which a previous translation was available.

Token item 314, representing a token designated "B", has associated sentence position item 354 and skip item 356. Token B is one of the tokens in the sentence begun by token A. Sentence position item 354 can indicate the position of token B within the sentence, while skip item 356, like skip item 352, indicates that no other translations were obtained for token B.

As noted above, token C is the first token of a chunk. In the illustrated example, a translation for the chunk as a whole was not obtained in box 270. In that case, if the chunk had met an appropriate criterion, such as based on length or tags, token items for tokens within the chunk might have been marked with skip items like items 352 and 356. Since a translation for the chunk was not obtained, translations were obtained for tokens within the chunk, including tokens C and D.

In the illustrated example, token C is an MWE, and MWE translation item 360, associated with token item 316, indicates a translation for token C obtained from an MWE lexicon. MWE translation item 360 can also include additional information, such as a confidence level, an identifier of the translation source, and possibly morphosyntactic or semantic tags applicable to the translation.

In contrast, token D is a single word token for which the translation sources include several translations that are consistent with the POS tag from disambiguation item 340. Token translation set 362 therefore includes M token translations, as shown, each with additional information such as a confidence level based on how it was derived, a translation source, and possibly morphosyntactic and semantic tags, possibly indicating its probable domain or domains.

Even if a translation had been obtained for the chunk begun by token C as a whole, it would also be possible for token D to be an insertion into the chunk, meaning that the remainder of the chunk, excluding token D, is an MWE or idiom for which it may be possible to obtain a translation. An example of an English insertion would be the word "boldly" in the idiom "take the bull boldly by the horns". In this case, token D could be detected to be an insertion, in which case it would not be marked skipped, and translations would be obtained for it.

Token E, which is not in the chunk begun by token C, is a token for which the translation sources do not provide any translations. Therefore, NULL translation item 364 is associated with token item 320, and indicates that no translations were obtained; as a result, in default of a tag or other indication to the contrary, the token represented by token item 320 could itself be included in a sequence of translations.

Of the subexpressions illustrated in FIG. 6, only token D has more than one translation. Therefore, the act in box 272 produces selected translation set 366, which includes N translations selected from token translation set 362 and ranked from selected translation 1 through selected translation N, where N≦M. Selection can be based, for example, on tags from disambiguation item 340 and from disambiguation items of nearby tokens, on tags from chunk information 334 (accessed using the chunk position from item 342), and on information included with each translation in set 362. Each translation in set 366 can include the same additional information as in set 362, and selected translation set 366 could alternatively be obtained simply by adding a ranking to each translation in set 362.

Completion of selection in box 272 produces a preliminary sequence of translations for the current sentence. In the example in FIG. 6, the preliminary sequence for the sentence beginning at token A would include the sentence translation from item 350; the preliminary sequence for the sentence that includes the chunk beginning at token C includes the MWE translation from item 360 and selected translation 1 and other selected translations from set 366; and the preliminary sequence for the sentence that includes token E includes the surface form of token E from item 320. Although a sentence's preliminary sequence may indicate one or more meanings in the target language without further modification, it is generally beneficial to modify the preliminary sequence to increase understandability.

One way to increase understandability is to reinflect translations in accordance with tag transfer rules 224, in box 274 in FIG. 5. Tag transfer rules 224 can be rules developed by a linguist that indicate, for each combination of inflection tags in the input language, a counterpart combination of inflection tags in the target language.

A way in which tag transfer rules could be developed can be understood from the following example:

The sequence of tags for the English expression "The little girl" (ie. DET ADJ NOUN-SG for Determiner, Adjective and Noun singular) would be transferred into French as DET-?-? ADJ-?-? NOUN-?-SG (thus propagating the information that the English head noun "girl" is singular, while the gender of the French gloss for "girl" is yet unknown (as indicated by the ? in NOUN-?-SG); similarly, both the gender and the number of the glosses for the determiner "The" and for the adjective "little" are unknown at this stage, as indicated by the two ?s in DET-?-? and ADJ-?-?.

A set of agreement rule can actually refine the information on the French tag by imposing the same number for the determiner and the adjective as for the head noun. This would lead to the following set of transferred tags: DET-?-SG ADJ-?-SG NOUN-?-SG. After dictionary lookup and selection of a translation for "girl" (e.g. "fille" which is a French feminine noun) a second set of transfer rules based on agreement rules can determine the gender of the tokens in the French expression, i.e. providing a full set of transferred French tags (DET-FEM-SG ADJ-FEM-SG NOUN-FEM-SG) leading to the following gloss for "The little girl": La petite fille.

Inflection tags from disambiguation item 332 and chunk item 334 can be used to obtain transferred tag item 370, indicating transferred inflection tags that can then be used with the MWE translation from item 360 to obtain reinflected MWE translation item 372. Similarly, inflection tags from disambiguation item 340 and chunk item 334 can be used to obtain transferred tag item 374, indicated transferred inflection tags that can then be used with the selected translations from set 366 to obtain reinflected translation set 376, again with N translations. Reinflected translation set 376 thus replaces selected translation set 366 in the preliminary sequence of translations.

Although tag transfer and reinflection in box 274 can often be straightforward, in some cases it may require resolution of morphosyntactic ambiguities and addition of missing or underspecified morphological features. Various techniques can be used for these purposes: One technique is to select missing morphological features from a target language lexicon, such as gender for nouns when translating from a language in which nouns do not have gender. Another technique is to propagate features for underspecified words such as determiners, adjectives, or finite verbs, such as by taking a subject's tags, by taking tags from the closest noun to the right for a determiner or an adjective, or by taking tags from the closest noun to the left for a very rough approximation. Yet another technique is to provide default features where features are missing, such as masculine singular as the default for underspecified determiners and adjectives.

Another way to increase understandability is to reorder translations within the preliminary sequence. Although it is most often useful to reorder translations within a chunk, in some instances it is also useful to reorder portions of a preliminary sequence that include translations for different chunks. Rewriting rules can also provide for contextual inflection for those cases where a simple part of speech transfer using transferred tags is insufficient to obtain a good result in the target language (for instance where the target language has a richer set of morphological features than the source). Upon recognizing a particular context, a rewriting rule can adjust the inflected form that appears to the user.

Conventional rewriting rules can be used to reorder translations, by providing a set of rules that is specific to translations from a specified input language to a specified target language. Each rule can, for example, specify a set of constraints and a function that is performed if the constraints are met.

The constraints could include that a given token's surface form is a specified string; that a given token's part of speech is a specified part of speech, or that a given token's head word is a specified string, for example, or logical combinations of simple constraints. The function could swap the positions of two tokens, change a token's part of speech, add part of speech information to a token, remove a token, give a new translation for a token, or reorder a list of consecutive tokens.

A rule can be followed by a stop, in which case, if the rule applies to a token, no other rule in the same block will be applied to the token. A block of rules can similarly be followed by a stop, in which case, if a rule in the block was applied to a token, no other block or rule of the same level as the block should be applied to the token. Other than these exceptions, rules can be applied in order, so that their effects are cascaded.

A specific rewriting scheme will have a limit of robustness, within which it is able to improve the understandability of a gloss. Rewriting rules like those above are, for example, robust enough to handle several common situations that arise in translating from English to French or vice versa: Rewriting rules can change the English auxiliary "will" to a "+Future" morphological tag applied to the appropriate French verb, and vice versa; English negatives, such as "does not", can be written as appropriate to French, such as "ne . . . pas", and vice versa; and English "Adjective Noun" sequences can be rewritten as French "Noun Adjective" sequences, and vice versa.

In FIG. 6, the effect of reordering by applying rewriting rules 226 is illustrated by reordered chunk start item 378, an item of data added by the act in box 276 to indicate that reinflected translation 1 in set 376 is the first translation in the translated chunk. Item 378 can include additional information about the translated chunk, such as the number of translations it contains. In addition, reinflected translation 1 has an associated pointer to a series of translations designated by the circled number "3", which are in turn followed by reinflected MWE translation in item 374, the last translation in the translated chunk.

Gloss generation is completed for each sentence by performing the act in box 278 in FIG. 5 to add the resulting sequence of translations for the sentence. This is illustrated in FIG. 6 by sequence start item 380, an item that could be added when the resulting sequence of translations for the first sentence is obtained. Item 380 is associated with list 310 and includes a pointer to the sequence of translations for the first sentence, represented by the circled number "1"; item 380 can also include other information relating to the sequence of translations. Within each sentence's sequence, each translation can similarly include a pointer to the next translation in the sentence's sequence, as illustrated by the pointer from item 376, discussed above, and also by the pointer from item 372, which leads to the remainder of the translation of a sentence, designated by the circled number "4". The final translation in each sentence's sequence can also have a pointer that leads to the first translation in the next sentence's sequence. For example, item 350 has a pointer to the next sentence's sequence, represented by the circled number "2". Where a token has a NULL translation, a pointer can be directed to the surface form of the token, as illustrated by the incoming pointer to token item 320, representing token E.

Generation of a gloss can therefore capture a large amount of information, much of which can be useful in presenting information about the gloss to a user.

C.5. Gloss Interface

Information about glosses can be presented in many different ways, using a wide variety of output devices with different information presentation capabilities. In general, one objective is to present information that indicates the meaning of the input text, so the user can be given, to the extent feasible, various ways to increase or decrease the information presented until an understanding of the input text is reached. Another objective is to provide as much relevant information as the output medium allows, making compromises when necessary, e.g. for printed output for which options must be pre-defined; in general, screen-based presentations allow a greater degree of interactivity, with display and linguistic options selected by the user and easily changed to provide greater information for difficult passages. Another objective can be to allow a user with no knowledge of the source language to produce a translated text in the target language.

Figure 7:
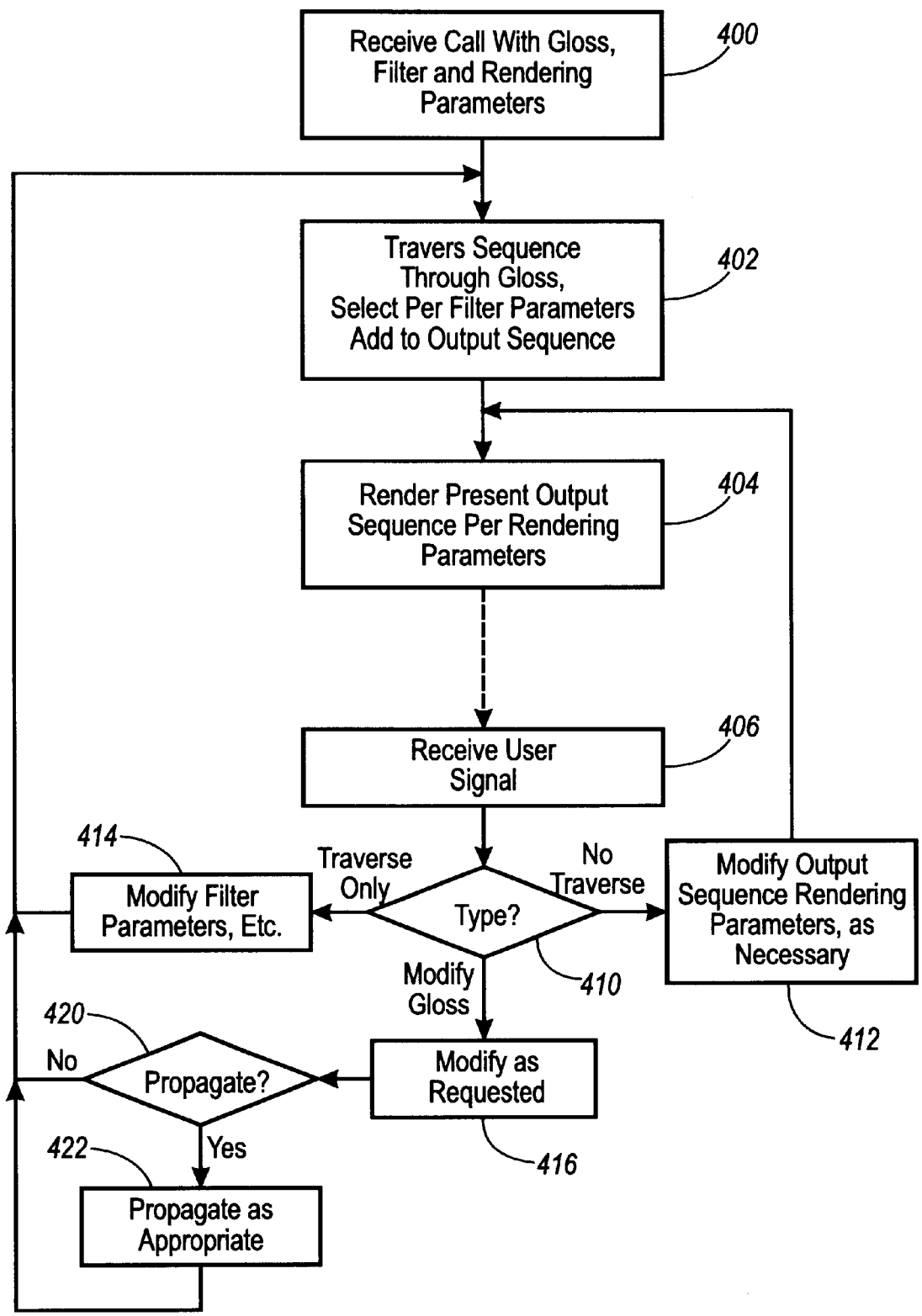
FIG. 7 is a flow chart showing acts in providing information about a gloss for presentation, as in box 280 in FIG. 5.

FIG. 7 illustrates acts in one method of presenting information about a gloss with a sequence of translations like that described above in relation to FIG. 6. The method in FIG. 7 could be used to implement the act in box 280 in FIG. 5, and could be one of gloss interface routines 196 in FIG. 4.

The method in FIG. 7 begins in box 400 in response to a call that includes a handle for a gloss. The call also includes data defining a set of filter parameters to be applied to the gloss and a set of rendering parameters with which to render an output sequence obtained from the gloss.

The act in box 402 responds to the call by traversing the sequence through the gloss. In gloss 300 in FIG. 6, for example, traverse of the sequence could begin with item 380. At each item along the sequence, the act in box 402 selects a set of zero or more translations in accordance with the filter parameters from box 400. The selected set of translations are added to an output sequence of translations, together with relevant information about ranking, relation to the input text, and so forth. The act in box 402 can also update information about the output sequence for use in rendering, such as its length.

When the output sequence is complete, the act in box 404 renders the output sequence in accordance with the rendering parameters from box 400 and provides the rendered output sequence to an output device for presentation. The rendering parameters can specify the output device so that rendering can be performed in a way appropriate to the output device. For example, if the output device is a printer or other device for presenting images on paper or another printing medium, the rendered output sequence will have a format appropriate for its print driver. If, on the other hand, the output device is a cathode ray tube (CRT) or other display, the rendered output sequence will have a format appropriate for its display drivers.

As suggested by the dashed line in FIG. 7, the user to whom the rendered output sequence is presented may provide a signal in response, and the act in box 406 receives the user signal. If the output device is a printer, user signals could be provided through an appropriate paper user interface, such as by scanning an image. If the output device is a display, user signals could be provided interactively through a point and click user interface using a pointing device such as a mouse, for example.

The act in box 410 branches on the type of user signal received in box 406. FIG. 7 illustrates three types of user signals, although various other signals could be received.

Some user signals indicate changes in the output sequence or in rendering parameters that can be made without traversing the gloss. For example, if the output sequence includes a ranked set of translations for a subexpression and a rendering parameter can indicate how many of the set to present or the size at which translations are presented, it is not necessary to traverse the gloss again when the user signal changes the rendering parameter. Similarly, if the user signal simply requests that a selected part of the output sequence not be presented, the selected part can be removed from the output sequence without traversing the gloss. In cases like these, the act in box 412 can modify the output sequence or the rendering parameters in accordance with the user signal before returning to box 404 to again render and present.

Other user signals indicate changes that require that the gloss be traversed but do not require that it be modified. For example, a change in filter parameters does not require modification of the gloss. In cases like these, the act in box 414 modifies the filter parameters or makes other changes in accordance with the user signal before returning to box 402 to traverse the gloss and obtain a new output sequence.

A sequence of output sequences produced and rendered by repeatedly modifying the filter parameters can be thought of as different filtering views of the gloss. Since gloss 300 includes various information about tokens, a user signal could request presentation of a different subset of the available information. For example, the user could request a specific number of translations; only the first translation; all available translations; all selected translations, before or after reinflection; only translations with confidence levels above a threshold; only translations from specified domain specific lexicons; only translations with certain semantic tags; etc. If the gloss preserves information about token or translation frequency, the user could request only presentation of translations for tokens above a specified frequency or presentation only of translations that are themselves above a specified frequency. In a variant, the user input circuitry could provide signals analogous to turning a dial, with a turn in one direction increasing the level of detail and a turn in the other decreasing the level of detail. In each of these cases, the request could be made locally, for a specific token, chunk, sentence, or text, or globally for the entire glossing session. Automatic techniques could also be employed at user request to identify, for each subexpression, a first choice translation which would be presented, permitting the user to then select subexpressions for which more detail is required.

Another type of user signal that would not require modification of the gloss would be a mode shift, such as into an alternate mode in which the user can click on a word in the input text to obtain presentation of its complete dictionary definition.

Still other user signals indicate changes that require modification of the gloss. There are many examples of such changes, including editing the input text; selecting or providing a new input text; modifying the input or target language; modifying the selection routines or parameters they apply; modifying the translation sources; modifying the information retrieved from a translation source, such as retrieving an complete entry for a token rather than just a subset; modifying the tag transfer or rewriting rules; and modifying the order of translations for a subexpression, either locally or in a way that propagates. In cases like these, the act in box 416 makes the necessary changes locally.

The act in box 420 then branches based on whether the user signal indicates that the change should propagate, which is especially relevant in case the order of translations for one or more subexpressions is modified. If the changes should propagate, the act in box 422 propagates the changes as appropriate, obtaining a modified gloss before returning to box 402 to obtain an output sequence from the modified gloss.

In some cases, a requested change is applicable only to a specific token, so that no propagation is appropriate. But sometimes a change is requested that applies to all other occurrences of the same token in the input text, in which case the change can propagate by finding all such tokens and reranking their translations accordingly. In other cases, the same change could be applied to all tokens in the input text, such as a change in the lookup process performed in box 270 or in the selection process performed in box 272, in which case the change can propagate by modifying the lookup or selection process and by then performing the changed process and subsequent processes to obtain a modified gloss. Still other changes could be applied to other input texts, in the same domain or in general, in which case they can be saved as appropriate initializations or other modifications of the routines. For example, context-based rules, such as that a specific word should be translated in a specific way in a certain domain, could be generated based on the user signal and propagated to other input texts. Or weightings of a confidence level matrix could be trained based on the user signals and similarly propagated.

C.6. Specific Implementations

A prototype implementation has been successfully demonstrated using the Xerox Linguistic Development Architecture (XeLDA), some features of which are described in copending, coassigned U.S. patent application Ser. No. 09/221,232, entitled "Executable for Requesting a Linguistic Service", incorporated herein by reference. XeLDA provides an interface to a number of linguistic modules that perform shallow operations such as tokenization, MWE recognition, morphological analysis, POS disambiguation and tagging, shallow parsing or chunking, dictionary lookup, sense disambiguation, translation memory lookup, etc. Because of the modular approach, a linguistic component from XeLDA can be easily replaced with another component that becomes available.

The prototype implementation linked standard XeLDA modules and included some specially written additional code. The prototype implementation began with formatted text, including HTML tags. Preprocessing provided format encoded text. Tokenizing provided a lexeme list. Morphological analysis provided a morpho-syntactic list. Disambiguation provided a restricted morpho-syntactic list. Chunking/parsing provided a list of annotated chunks. Lookup provided a dictionary entry list. A post-lookup scan provided modified dictionary entries. A display list was then created, and an output display list operatioin provided the display list in the form of formatted text with HTML tags.

The preprocessing module, implemented in a straightforward manner, received ASCII text with HTML tags as input. The module filtered the input to a form suitable for XeLDA's FSM tokenizer. The module encoded or removed formatting and other special marks and recognized the type of input given. For example, in ASCII, significant spacing, line breaks, and punctuation marks not dealt with by the tokenizer were encoded in a form suitable for use by the ASCII output module described below. Also, HTML tags were encoded to pass unchanged through the lookup, and embedded accented character tags were changed to character representation. The output was text with encoded format.

The tokenization module included a standard XeLDA FSM tokenizer and an MWE recognizing and tokenizing finite state transducer (FST). The tokenization module split the text with encoded format into a list of tokens. Tokens could be individual words, encoded format/punctuation marks, or MWEs. The MWE tokenizer determined the MWEs to be recognized during lookup. The output list of tokens was called a lexeme list.

The morphological analysis module included a standard XeLDA morphological analyzer. The module determined the possible lemmas (baseforms), parts of speech, and morphological features for each token, and provided as output a list structure with morpho-syntactic possibilities. MWE tokens were given a default part of speech.

The disambiguation module included a standard XeLDA disambiguator. The module used a Hidden Markov Model (HMM) to choose the most likely lemma/part of speech combination from the possibilities for each token in the list structure. The output was a version of the list structure with a single possibility for each token, referred to as an annotated text.

The chunking/parsing module was initially implemented only as a function of using a MWE tokeniser. In a more advanced implementation, it could include an instance of the XeLDA sentence class as well as specially written code. It could split the annotated text into chunks such as noun phrase, verb phrase, sentence, etc. for lookup in translation memory. The XeLDA sentence class could take the disambiguation result and split it into a list of morphological possibilities on sentence/punctuation boundaries. The output of the chunking/parsing module could be a list of annotated text chunks.

The dictionary lookup module included a XeLDA "PreferIdiomAndSkip" dictionary lookup as well as specially written code. The module would check each chunk and token in the list of annotated text chunks to determine whether it is an MWE contained in a translating FST or an idiom or a word in the dictionary. If an idiom, the result for the idiom together with the word result for any idiom insertions would be returned. If a word, the dictionary word entry for the POS tag from disambiguation would be returned. The "PreferIdiomAndSkip" lookup would prefer the FST lookup in preference to idiom lookup. The module would provide as output a list of dictionary entries, thus selecting the ranking of translations set forth in the dictionary entries.

The post-lookup scan module included application of XeLDA-based rewriting rules. In a language independent part, the module would restore formatting of the list of dictionary entries back to that of the original input text. In a language dependent part, the module would apply source-to-target language rewriting rules to the list of dictionary entries from the lookup module. The rewriting rules might reorder entries, change or eliminate translations, change part of speech, and so forth, as described above in relation to rewriting rules. The module would output a modified list of dictionary entries.

A display list creation module included specially written code that extracted information to be displayed from a dictionary entry list, in accordance with a display type and display parameters. The translations to be displayed were determined, and POS tags were transferred to target language form in order to inflect the translation to an appropriate surface form using XeLDA's morphological analyzer for the target language in reverse. This module could be called independent of other modules to quickly reformat a lookup result. This module would output a display list.

The output display list module included specially written code, and would render the display list for specified purposes. For example, for comprehension assistance, the module would output ASCII or HTML formatted text output, in accordance with the input. For linguist output, the module would show the effect of all options, with indications for a linguist of how each part of the gloss was derived.

Operation of the prototype implementation can be understood from the manner in which it provided an English gloss for the following French sentence: "Afin de maintenir la compétitivité de Rank Xerox sur le marché l'effectif du groupe est en baisse pour la quatriéme année consécutive."

The prototype implementation provided the initial gloss: "In order to maintain the competitiveness of Rank Xerox on the market, the enrollment of the group is going down for the fourth year consecutive." It also provided a user interface through which alternative translation choices were available.

The prototype implementation recognized "Rank Xerox", the former name of Xerox Ltd., as an MWE, and treat it as a single token.

The prototype could also recognize inflected MWEs. For example, it could perform operations similar to recognizing "est en baisse" as an MWE, normalizing it to "être en baisse", looking it up in a bilingual dictionary to obtain "to go down", and correctly reinflecting it as "goes down".

The prototype would recognize "effectif" as a noun in this context, although it could, in other contexts, be an adjective. The noun "effectif" has many potential translations. Although the most appropriate translation in this context, "workforce", is not included in the initial gloss set forth above, presentation of more than one translation for a token would allow the system to present it.

The prototype provided a user interface making presentation of alternative translations possible. Alternative translations could be initially presented, such as above and below each other. And if, when the gloss was rendered and presented on a display, the user used a mouse to point to a word in the gloss, the prototype would present a menu. A first section of the menu would include the ranked list of translations from which the translation had been chosen, a second section would include the original word in a non-selectable form, and a third section would include manipulation options such as "delete", "<swap" for swap with the word to the left, and "swap>" for swap with the word to the right. For the word "maintenir", for example, the first part of the list would include "keep", "keep up", "maintain", and "support", according to a default ranking based on the dictionary order.

The prototype could perform operations like translating the chunk "quatriéme année consécutive" as "fourth consecutive year" thanks to rewriting rules that apply to the chunk. This is possible because the words of the chunk are not polysemous.

A newer version of the prototype has subsequently been implemented and successfully demonstrated, again using XeLDA modules. The newer version performs chunking/parsing with an incremental finite state parser (ISFP) employing techniques described in the article by A ı̈t-Mokhtar and Chanod cited above; ISFP produces chunks for a sentence being glossed and also for examples in a bilingual dictionary. The newer version also performs semantic selection using semantic disambiguation techniques based on dictionary lookup, but does not include confidence level assignment. The newer version benefits from extensive rewriting rules that have been developed to improve glossing results by improving translation selection and the understandability of output; the rewriting rules reorder words based heavily on syntactic relations identified by ISFP.

The newer version provides a display-based user interface that can operate as follows: A user can type a French sentence into a window and request that glossing be performed on the sentence, in which case each word's most likely translation from the gloss is presented adjacent the word. Words of the sentence with more than one translation in the gloss for their disambiguated part of speech are highlighted, such as by being presented in yellow. When the user selects one of the highlighted words, its other translation choices are displayed, so that the user can choose a less likely translation for the gloss.

During lookup, the newer version extracts semantic and syntactic context from examples in a word's dictionary entry, using information from ISFP and from the examples themselves. If a word appears in a similar context in an example to its context in the sentence, this suggests that the sense in which the example occurs is the sense the word has in the sentence. This information, together with other information about the word's context in the sentence, is taken in to account in ranking the senses of its dictionary entry.

The chunks for the sentence are used to obtain two lists, one of word nodes and another of phrasal nodes. Words in the list of word nodes can be linked to their dictionary entries, such as by having the same index in the list as the dictionary entries have in an array. Words without useful definitions may be replaced by character strings. Words in the word list and chunks in the phrasal list can be reordered according to the rewriting rules. In preparation for display, the dictionary entry list is rearranged in accordance with the reordered word list, and the most likely dictionary entries from the list provide the initially presented gloss.

An implementation with a paper-based interface has also been successfully demonstrated, also using XeLDA modules. This implementation scanned a cover sheet indicating the target language and a page on which the input text was printed. The implementation performed conventional optical character recognition (OCR) to obtain the input text, from which a gloss was obtained much as described above for the prototype implementation.

In the paper-based implementation, the output was constrained to what can be presented on a printed sheet, but several levels of output could nonetheless be provided. At one level, the input text was printed, and translations were printed adjacent words that met a criterion for being difficult to understand, such as based on similarity to the translation (using various methods of comparison). At another level, all of the definitions in the gloss were printed to provide a type of dictionary for the input text. And at yet another level, a complete gloss was printed, as reinflected and reordered by rewriting rules, including, to the extent permitted by available space, all translations for each word; for example, the gloss could include a central string of subexpressions for which there only one translation choice was obtained, but where more than one ranked translation choice were obtained for a subexpression, they could be displayed in a vertical sequence extending upward and downward from the central string, allowing the user to compare them to decide which was the best fit for the context. The full gloss result could also be e-mailed to a specified user enabling the use of an interactive viewer as previously described.

C.7. Results

As noted above, each of the above implementations has been successfully demonstrated. During some of the initial demonstrations, researchers familiar with the translation art expressed surprise and skepticism at the extent to which an understanding of input text could be obtained from a gloss. Subsequent work has shown, however, that the techniques described above can be developed and extended to produce successively better glosses. It is now clear that an understanding of text in an unfamiliar language can be obtained by computer-implemented glossing that is more than mere dictionary lookup but much less than full automatic translation.

The surprise expressed by those skilled in the art may result from an unstated belief that one can only understand an unfamiliar language by behaving like a translator: A translator is typically fluent in two languages, and reads or hears a sentence of text or speech in a source language to obtain a sense of its meaning as a whole; then the translator composes a sentence in the target language that has approximately the same meaning.

But glossing is apparently successful because it provides an alternative path to understanding a sentence: By providing an automatically or semi-automatically obtained sequence of most likely translations for tokens, possibly reinflected and reordered, it is possible to suggest the meaning of the sentence as a whole. The reader of the sequence can use this fragmented, ambiguous, and incomplete information, possibly interacting with it to change some of the translations to less likely alternatives, and obtain an understanding that is sufficient for many purposes, possibly allowing the user to compose a translation.

Glossing in this manner is fundamentally different than translating. Unlike a translation, a gloss can include ambiguities and multiple translations. Unlike the process of machine translation, glossing makes no attempt to systematically produce a full analysis of a sentence or paragraph of input text as a basis for translation; this is one reason glossing is much less intensive computationally than machine translation. And unlike conventional machine translation techniques, a glossing system can be implemented to allow the user to modify the process by which translations are selected or ranked, so that glossing can be much more flexible than machine translation.

C.8. Variations

The implementations described above could be varied in many ways within the scope of the invention.

The implementations described above have been successfully executed on Sun workstations and PCs, but implementations could be executed on other machines.

The implementations described above have been successfully executed using source code written in C++ and Java on the Solaris and Windows NT platforms, but other programming environments and platforms could be used.

The implementations described above operate on multi-token expressions in input text, but the invention could also be implemented to operate on multi-token expressions in speech.

The implementations described above obtain subexpressions of a multi-token expression by tokenization and chunking using modules from XeLDA, but subexpressions could be obtained in various other ways using various other software, including a wide variety of linguistic analyzers and tools that could be applied. Other modules could be used, and rather than a modular implementation, the invention could be implemented using nonmodular programming techniques.

The implementations described above can tokenize various kinds of expressions in addition to simple words, and can translate multi-word expressions and, using translation memory, longer subexpressions such as sentences. But the invention could be implemented simply with one or more bilingual dictionaries for translation of words.

The implementations described above obtain translation choices for nearly every subexpression, and use several types of translation sources as described above. It would be within the scope of the invention to obtain translation choices only for a subset of subexpressions selected by an appropriate criterion, and various other types of translation sources could be used.

The implementations described above rank translation choices in various ways, many of which rely on context as obtained by disambiguation or shallow parsing, and some of which rely on user interaction. As noted above, however, it is often sufficient to automatically rank translation choices in the order in which they appear in a dictionary. Ranking could be performed in a wide variety of ways in addition to those described above, possibly including frequency of occurrence, although no situations were discovered in which this worked especially well.

The implementations described above allow the user to modify various parameters and processes, but the user could also be permitted to modify additional parameters and processes, including the manner in which tokenization and chunking are performed, the translation sources that are available, the extent to which and manner in which reinflection and rewriting are performed, the manner in which sequences of translations are presented, exclusion lists of subexpressions that should not appear in a gloss, confidence thresholds and limits that determine how ranking and selection are performed, and so forth.

Some of the implementations described above allow for specific ways of propagating ranking modifications made by a user, but propagation could be performed in additional ways. For example, a signal could be sent to a central server that is capable of collecting user input from a number of clients on which the invention is implemented and can update rule sets periodically.

The implementations described above obtain ranked translation choices in a gloss data structure that includes a large amount of information about a sentence being glossed, and produce a sequence of translations by including pointers or other such information within the data structure. The invention could be implemented, however, with a wide variety of data structures, and without including all information in a single data structure. In addition, a sequence of translations could be produced as a list or as hyperlinked metadata.

The implementations described above do not attempt to reconstruct a full translated sentence, but the invention could be implemented in an environment in which full translation is also attempted, possibly enabling translation to be performed by a user with no knowledge of the source language, although with some risk of getting details wrong.

In producing a sequence of translation choices, the implementations described above perform tag transfer and reinflection and apply rewriting rules to improve understandability, but the invention might possibly be successfully implemented without reinflection and rewriting, and could be implemented with additional techniques to improve understandability.

The implementations described above used input text from electronic files or from OCR performed on a scanned image of text, but input text from other sources could be used, such as from voice recognition. The quality of the input text bears directly on the quality of the output, and an OCR-based implementation must allow for the inaccuracies of OCR.

In presenting information about a sequence of translations, the implementations described above follow two distinct approaches, one providing display-based presentations and the other providing paper-based presentations, but these are only two examples of the various techniques that could be used to present information about a sequence of translations to a user within the scope of the invention.

More specifically, the information about a sequence of translations in the implementations described above is a selected subset of translations in the sequence, presented in any of several ways in relation to an input text. Various other types of information about a sequence of translations could be presented, and translations could be presented in various other ways, including the use of a lens-like interface in which a gloss for all of an input text is contained within a display area that resembles a lens, on the same screen as the input text or on another, specialized display device that may also have the capability to scan the input text. An interface could also be provided that assists a person who is unfamiliar with a source language but has a strong facility in a target language to produce a reasonable translation of an input text in the target language.

The implementations described above have been applied to French-to-English glossing, but the invention can be applied to glossing from source languages other than French to target languages other than English.

In the implementations described above, specific acts are performed that could be omitted or performed differently. For example, in a simplified form of glossing, chunking could be omitted. More generally, almost any particular module can be omitted at the cost of inaccuracies, greater ambiguity or poorer ordering of the glosses; for example, a translation memory module, although optional, can improve results considerably for those cases where there is a hit.

In the implementations described above, acts are performed in an order that could be modified in many cases. For example, in FIG. 5, rather than adding each sentence's sequence to the gloss for an input text, a gloss could be provided for each sentence as soon as it is completed.

The implementations described above use currently available computing techniques, but could readily be modified to use newly discovered computing techniques as they become available.

D. Applications

The invention could be applied in many ways, and is generally applicable wherever an understanding of another language is required but full accurate translation is unnecessary or unavailable.

The following are applications in which the invention could be used instead of full machine translation:

A glossing Web browser, producing a gloss of foreign language Web pages.

An e-mail glosser, producing a gloss of a foreign language e-mail message. This application could be an optional service provided on a mail server, and could include automatically recognizing the language of each e-mail and then providing a gloss in accordance with a stored profile of the recipient.

A news glosser, providing a gloss of foreign language news wires transmitted via wire service or Usenet new feed. This application could similarly be an optional service on a news server or on a client machine.

A subtitle glosser, working in combination with a teletext or closed caption unit to gloss teletext pages and captions, thus providing real time translation of foreign language television programs.

A speech translator, working in combination with voice recognition software to improve understanding of foreign language speech. The input could be voice and the gloss could be either text or voice.

A comprehension aid for difficult text such as technical manuals or for any other text, including newspapers, travelers' guides, etc., or for information retrieved from a multilingual information system.

In addition to the above applications, it is possible that implementations of the invention can be developed that enable a person who is unfamiliar or only slightly familiar with a source language but has a strong facility in a target language to produce a reasonable approximation of a full translation of an input text in the target language.

E. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method for providing information about meanings of multi-token expressions in a first natural language, where the information provided is understandable in a second natural language; the method comprising:
   (A) obtaining subexpressions of a multi-token expression in the first natural language;
   (B) obtaining translation choices in the second natural language for a set of the subexpressions, at least two of the translation choices being for one of the subexpressions;
   (C) ranking a subset of the subexpression's translation choices;
   (D) using the ranked translation choices to produce a sequence of translation choices for the multi-token expression as a whole; and
   (E) presenting information about the sequence of translation choices to a user, the information about the sequence indicating in the second language the meaning of the multi-token expression.

2. The method of claim 1 in which (A) comprises:
   tokenizing the multi-token expression to obtain a sequence of tokens; and in which (B) comprises:
   (B1) obtaining, for each token, a normalized form; and
   (B2) obtaining one or more translation choices for the normalized form of each token.

3. The method of claim 2 in which the sequence of tokens includes a multi-word expression and in which (B2) uses a multi-word expression lexicon to obtain translation choices for the normalized form of the multi-word expression.

4. The method of claim 2 in which (B1) comprises:
   (B1a) obtaining an inflection tag indicating a relation between a token and its normalized form; and in which (B2) obtains a normalized form of each translation choice for the normalized form of the token and in which (B) further comprises:
   (B3) using the inflection tag and the normalized form of each translation choice to obtain a surface form of the translation choice.

5. The method of claim 4 in which the normalized form of a translation choice is a multi-word expression and in which (B3) inflects the normalized form of the translation choice.

6. The method of claim 4 in which (B1a) comprises:
   (B1a(i)) obtaining a set of one or more alternative part-of-speech tags for each token;
   (B1a(ii)) using the sets of alternative part-of-speech tags to obtain a single part-of-speech tag for each token;

(B1a(iii)) using the single part-of-speech tags for the tokens to group the tokens into one or more token group subexpressions; and (B1a(iv)) obtaining a token group tag for at least one token group subexpression, the token group tag indicating a type of token group subexpression.

7. The method of claim 6 in which (D) comprises:

using the token group tag to reorder translation choices within a portion of the sequence of translation choices obtained for tokens within the multi-token expression.

8. The method of claim 6 in which (B1a(iv)) obtains token group tags for at least two of the token group subexpressions and in which (D) comprises:

using the token group tags to reorder, within the sequence of translation choices, portions of the sequence of translation choices for the two token group subexpressions.

9. The method of claim 2 in which (C) comprises:

obtaining a part of speech tag for each of a set of the tokens; and using the parts of speech for the set of tokens to rank the subexpression's translation choices.

10. The method of claim 1 in which the subexpression's translation choices are obtained from two or more translation sources and in which (C) comprises:

ranking the subexpression's translation choices based on their translation sources.

11. The method of claim 1 in which (C) comprises:

obtaining information about the subexpression's semantic context; and ranking the subexpression's translation choices based on the information about semantic context.

12. The method of claim 1 in which (C) comprises:

obtaining, for each of the subexpression's translation choices, a confidence level that depends on how the translation choice was obtained; and ranking the subexpression's translation choices based on their confidence levels.

13. The method of claim 1 in which (C) comprises:

receiving a user signal selecting a process for ranking translation choices; and ranking the subexpression's translation choices according to the process selected by the user signal.

14. The method of claim 1, further comprising:

(F) searching a translation memory for a previous translation of the multi-token expression; and in which (E) is performed only if (F) does not find a previous translation of the multi-token expression.

15. The method of claim 1 in which (E) comprises:

presenting on a display the sequence of translation choices, the sequence including a first one of the ranked set of translation choices for the subexpression that has two or more translation choices;

receiving a user signal selecting the first one of the translation choices; and in response to the user signal, producing and presenting on the display a modified version of the sequence; the modified version including at least a second one of the ranked set of translation choices for the subexpression.

16. The method of claim 1 in which (E) comprises:

printing the sequence of translation choices; the sequence including the ranked set of translation choices for the subexpression that has two or more translation choices.

17. The method of claim 1 in which the multi-token expression is an input text that includes at least one subexpression similar to the subexpression that has two or more translation choices and in which (E) comprises:

after presenting information about the sequence of translation choices, receiving a user signal indicating a modification of the ranking of translation choices for the subexpression that has two or more translation choices; and modifying ranked sets of translation choices of each similar subexpression in accordance with the modification indicated by the user signal.

18. The method of claim 1 in which, after the method is performed on the multi-token expression, the method is performed on a subsequent multi-token expression that includes a subexpression similar to the subexpression that has two or more translation choices and in which (E) comprises:

after presenting information about the sequence of translation choices, receiving a user signal indicating a modification of the ranking of translation choices for the subexpression that has two or more translation choices; and saving a descriptor of the modification indicated by the user signal; the descriptor being used when the method is performed on the subsequent multi-token expression that includes a similar subexpression to modify ranked sets of translation choices of the similar subexpression in accordance with the modification indicated by the user signal.

19. The method of claim 18 in which the subexpression occurs in a context in the multi-token expression and in which the descriptor is an item of rule data indicating a rule applicable to the subexpression when it occurs in contexts similar to the context; the rule, when applied, resulting in the modification indicated by the user signal.

20. The method of claim 18 in which (C) comprises:

ranking the subexpression's translation choices based on a set of confidence levels applicable to the translation choices;

the descriptor being a weighting of the confidence levels within the set that, when applied, results in the modification indicated by the user signal.

21. A machine for providing information about meanings of multi-token expressions in a first language, where the information provided is understandable in a second natural language; the machine comprising:

a multi-token expression in the first natural language;

a processor connected for accessing the multi-token expression; and user output circuitry for presenting information to users, the user output circuitry being connected for receiving information from the processor for presentation to users;

the processor operating to:

obtain subexpressions of the multi-token expression;

obtain translation choices in the second natural language for a set of the subexpressions, at least two of the translation choices being for one of the subexpressions;

rank a subset of the subexpression's translation choices based on the subexpression's context information;

use the ranked translation choices to produce a sequence of translation choices for the multi-token expression as a whole; and provide information about the sequence of translation choices to the user output circuitry for presentation to a user, the information about the sequence indicating in the second language the meaning of the multi-token expression.

22. The machine of claim 21 in which the user output circuitry includes a display.

23. The machine of claim 21 in which the user output circuitry includes a printer.

24. An article of manufacture for use in a system for providing information about meanings of multi-token expressions in a first language, where the information provided is understandable in a second natural language; the system including:

a multi-token expression in the first natural language;

a storage medium access device;

a processor connected for receiving data accessed on a storage medium by the storage medium access device and for accessing the multi-token expression; and user output circuitry for presenting information to users, the user output circuitry being connected for receiving information from the processor for presentation to users;

the article of manufacture comprising:

a storage medium; and instruction data stored by the storage medium; the instruction data indicating instructions the processor can execute; the processor receiving the instruction data from the storage medium access device and, in executing the instructions, operating to:

obtain subexpressions of the multi-token expression;

obtain translation choices in the second natural language for a set of the subexpressions, at least two of the translation choices being for one of the subexpressions;

rank a subset of the subexpression's translation choices based on the subexpression's context information;

use the ranked translation choices to produce a sequence of translation choices for the multi-token expression as a whole; and provide information about the sequence of translation choices to the user output circuitry for presentation to a user, the information about the sequence indicating in the second language the meaning of the multi-token expression.

25. A method of operating a first machine to transfer data to a second machine over a network, the second machine including a memory, user output circuitry, and a processor connected for accessing the memory, for accessing a multi-token expression, and for providing information to the user output circuitry for presentation; the method comprising:

establishing a connection between the first and second machines over the network; and operating the first machine to transfer instruction data to the memory of the second machine; the instruction data indicating instructions the processor can execute; the processor, in executing the instructions, providing information about meanings of multi-token expressions in a first language, where the information provided is understandable in a second natural language; the processor operating to:

obtain subexpressions of the multi-token expression;

obtain translation choices in the second natural language for a set of the subexpressions, at least two of the translation choices being for one of the subexpressions;

rank a subset of the subexpression's translation choices based on the subexpression's context information;

use the ranked translation choices to produce a sequence of translation choices for the multi-token expression as a whole; and provide information about the sequence of translation choices to the user output circuitry for presentation to a user, the information about the sequence indicating in the second language the meaning of the multi-token expression.

* * * * *